US012666406B2

(12) United States Patent
Wang et al.

(10) Patent No.: US 12,666,406 B2
(45) Date of Patent: Jun. 23, 2026

(54) ENHANCED NON-CODEBOOK-BASED UPLINK TRANSMISSIONS IN WIRELESS CELLULAR NETWORK

(71) Applicant: Intel Corporation, Santa Clara, CA (US)

(72) Inventors: Guotong Wang, Beijing (CN); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 18/456,368

(22) PCT Filed: Mar. 24, 2022

(86) PCT No.: PCT/US2022/021673
§ 371 (c)(1),
(2) Date: Aug. 25, 2023

(87) PCT Pub. No.: WO2022/204364
PCT Pub. Date: Sep. 29, 2022

(65) Prior Publication Data
US 2024/0214158 A1       Jun. 27, 2024

(30) Foreign Application Priority Data

Mar. 26, 2021    (WO) ................ PCT/CN2021/083162
Apr. 5, 2021    (WO) ................ PCT/CN2021/085518
(Continued)

(51) Int. Cl.
*H04L 5/00*            (2006.01)
*H04W 72/0446*       (2023.01)
(Continued)

(52) U.S. Cl.
CPC ....... *H04W 72/0446* (2013.01); *H04L 5/0053* (2013.01); *H04W 72/1263* (2013.01); *H04W 72/232* (2023.01)

(58) Field of Classification Search
CPC ........... H04W 72/0446; H04W 72/232; H04W 72/1263; H04L 5/0053; H04L 1/08; H04L 1/0072
See application file for complete search history.

(56) References Cited

U.S. PATENT DOCUMENTS

2019/0068268 A1    2/2019   Zhang et al.
2019/0174466 A1    6/2019   Zhang et al.
(Continued)

OTHER PUBLICATIONS

3GPP, "Technical Specification Group Radio Access Network; NR; Multiplexing and channel coding (Release 16)," 3GPP TS 38.212 V16.4.0 (Dec. 2020), 5G, 152 pages.
(Continued)

*Primary Examiner* — Andrew Lee
(74) *Attorney, Agent, or Firm* — Gray Ice Higdon, PLLC

(57) ABSTRACT

Systems, apparatuses, methods, and computer-readable media are provided to transmit multiple channel state information (CSI)-reference signal (RS) resources in different slots for non-Codebook based physical uplink shared channel (PUSCH) transmission in multi-transmission-reception point (TRP) operation. Other embodiments may be described and claimed.

16 Claims, 20 Drawing Sheets

(30) Foreign Application Priority Data

| | | | |
|---|---|---|---|
| Apr. 12, 2021 | (WO) | ................ | PCT/CN2021/086597 |
| May 11, 2021 | (WO) | ................ | PCT/CN2021/093078 |
| Sep. 14, 2021 | (WO) | ................ | PCT/CN2021/118105 |

(51) Int. Cl.

| | |
|---|---|
| *H04W 72/1263* | (2023.01) |
| *H04W 72/232* | (2023.01) |

(56) References Cited

U.S. PATENT DOCUMENTS

| | | | | |
|---|---|---|---|---|
| 2019/0229792 A1* | 7/2019 | John Wilson | ......... | H04W 72/23 |
| 2019/0273637 A1* | 9/2019 | Zhang | ................... | H04L 5/0051 |
| 2019/0349964 A1* | 11/2019 | Liou | ................... | H04W 72/046 |
| 2020/0396046 A1 | 12/2020 | Kwon et al. | | |
| 2020/0404525 A1* | 12/2020 | Rahman | ................ | H04L 5/0091 |
| 2021/0092721 A1 | 3/2021 | Zhou et al. | | |
| 2021/0259001 A1* | 8/2021 | Park | ................... | H04W 72/0453 |
| 2022/0116971 A1* | 4/2022 | Saber | ................... | H04W 72/23 |

| | | | | |
|---|---|---|---|---|
| 2022/0225284 A1* | 7/2022 | Hakola | ................. | H04L 5/0053 |
| 2023/0156488 A1* | 5/2023 | Song | .................. | H04B 7/06968 |
| | | | | 370/329 |
| 2023/0254087 A1* | 8/2023 | Wang | .................... | H04L 5/0051 |
| | | | | 370/330 |
| 2023/0327819 A1* | 10/2023 | Fang | .................. | H04B 7/06952 |
| | | | | 370/329 |
| 2024/0014935 A1* | 1/2024 | Yuan | .................. | H04B 7/06952 |
| 2024/0073880 A1* | 2/2024 | Zhou | .................... | H04L 5/0048 |
| 2024/0129097 A1* | 4/2024 | Li | ......................... | H04L 5/0053 |

OTHER PUBLICATIONS

International Patent Office—International Search Report and Written Opinion mailed Jun. 30, 2022 from International Patent Application No. PCT/US2022/021673, 10 pages.

Apple Inc., "On Multi-TRP Reliability Enhancement," 3GPP TSG-RAN WG1 Meeting #104-e, R1-2101351, Agenda Item: 8.1.2.1, e-Meeting, Jan. 25-Feb. 5, 2021, 12 pages.

* cited by examiner

```
SRS-ResourceSet ::=            SEQUENCE {
  srs-ResourceSetId             SRS-ResourceSetId,
  srs-ResourceIdList            SEQUENCE (SIZE(1..maxNrofSRS-ResourcesPerSet))  OF SRS-ResourceId   OPTIONAL,   -- Cond Setup
  resourceType                  CHOICE {
    aperiodic                     SEQUENCE {
      aperiodicSRS-ResourceTrigger   INTEGER  (1..maxNrofSRS-TriggerStates-1),
      csi-RS                         NZP-CSI-RS-ResourceId                        OPTIONAL,   -- Cond NonCodebook
      slotOffset                     INTEGER (1..32)                              OPTIONAL,   -- Need S
      ...,
      [[
      aperiodicSRS-ResourceTriggerList-v1530   SEQUENCE (SIZE(1..maxNrofSRS-TriggerStates-2))
                                       OF INTEGER  (1..maxNrofSRS-TriggerStates-1)  OPTIONAL   -- Need M
      ]]
    },
    semi-persistent               SEQUENCE {
      associatedCSI-RS                NZP-CSI-RS-ResourceId                        OPTIONAL,   -- Cond NonCodebook
      ...
    },
    periodic                      SEQUENCE {
      associatedCSI-RS                NZP-CSI-RS-ResourceId                        OPTIONAL,   -- Cond NonCodebook
      ...
    }
  },
  usage                         ENUMERATED {beamManagement, codebook, nonCodebook, antennaSwitching},
  alpha                         Alpha                                            OPTIONAL,   -- Need S
  p0                            INTEGER (-202..24)                               OPTIONAL,   -- Cond Setup
  pathlossReferenceRS           CHOICE {
    ssb-Index                     SSB-Index,
    csi-RS-Index                  NZP-CSI-RS-ResourceId
  }                                                                              OPTIONAL,   -- Need M
  srs-PowerControlAdjustmentStates  ENUMERATED {  sameAsFci2, separateClosedLoop}  OPTIONAL,   -- Need S
  ...
```

Figure 1

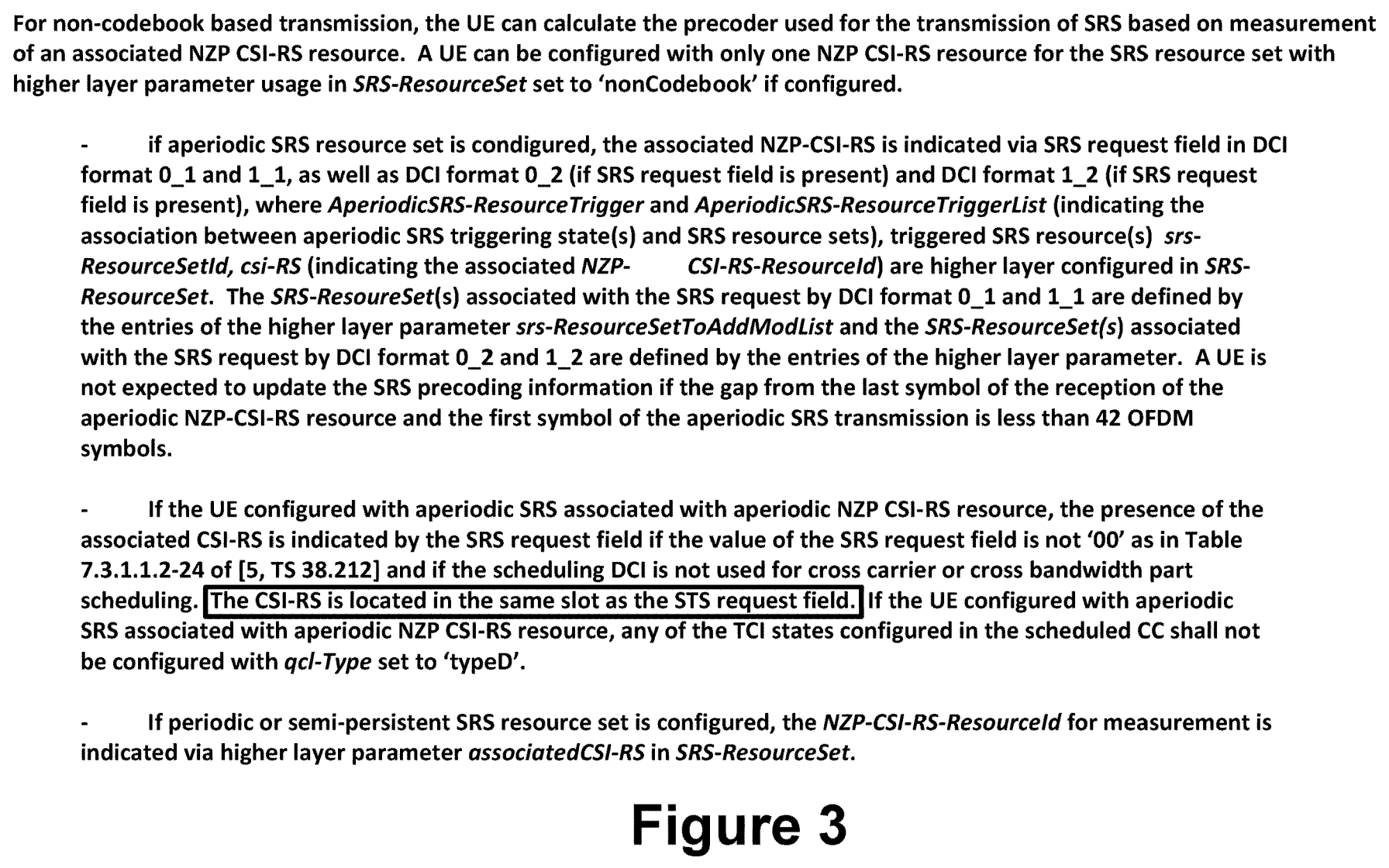

For non-codebook based transmission, the UE can calculate the precoder used for the transmission of SRS based on measurement of an associated NZP CSI-RS resource. A UE can be configured with only one NZP CSI-RS resource for the SRS resource set with higher layer parameter usage in *SRS-ResourceSet* set to 'nonCodebook' if configured.

- if aperiodic SRS resource set is condigured, the associated NZP-CSI-RS is indicated via SRS request field in DCI format 0_1 and 1_1, as well as DCI format 0_2 (if SRS request field is present) and DCI format 1_2 (if SRS request field is present), where *AperiodicSRS-ResourceTrigger* and *AperiodicSRS-ResourceTriggerList* (indicating the association between aperiodic SRS triggering state(s) and SRS resource sets), triggered SRS resource(s) *srs-ResourceSetId, csi-RS* (indicating the associated *NZP-        CSI-RS-ResourceId*) are higher layer configured in *SRS-ResourceSet*. The *SRS-ResourceSet*(s) associated with the SRS request by DCI format 0_1 and 1_1 are defined by the entries of the higher layer parameter *srs-ResourceSetToAddModList* and the *SRS-ResourceSet*(s) associated with the SRS request by DCI format 0_2 and 1_2 are defined by the entries of the higher layer parameter. A UE is not expected to update the SRS precoding information if the gap from the last symbol of the reception of the aperiodic NZP-CSI-RS resource and the first symbol of the aperiodic SRS transmission is less than 42 OFDM symbols.

- If the UE configured with aperiodic SRS associated with aperiodic NZP CSI-RS resource, the presence of the associated CSI-RS is indicated by the SRS request field if the value of the SRS request field is not '00' as in Table 7.3.1.1.2-24 of [5, TS 38.212] and if the scheduling DCI is not used for cross carrier or cross bandwidth part scheduling. The CSI-RS is located in the same slot as the STS request field. If the UE configured with aperiodic SRS associated with aperiodic NZP CSI-RS resource, any of the TCI states configured in the scheduled CC shall not be configured with *qcl-Type* set to 'typeD'.

- If periodic or semi-persistent SRS resource set is configured, the *NZP-CSI-RS-ResourceId* for measurement is indicated via higher layer parameter *associatedCSI-RS* in *SRS-ResourceSet*.

Figure 3

```
-- ASN1START
-- TAG-NZP-CSI-RS-RESOURCE-START

NZP-CSI-RS-Resource ::=        SEQUENCE {
    nzp-CSI-RS-ResourceId         NZP-CSI-RS-ResourceId,
    resourceMapping               CSI-RS-ResourceMapping,
    powerControlOffset            INTEGER  (-8..15),
    powerControlOffset88          ENUMERATED {db-3, db0, db3, db6}    OPTIONAL,
--  Need R
    scramblingID                  ScramblingId,
    periodicityAndOffset          CSI-ResourcePeriodicityAndOffset   OPTIONAL,
--  Cond PeriodicOrSemiPersistent
    qcl-InfoPeriodicCSI-RS        TCI-StateId                        OPTIONAL,
--  Cond Periodic

...
}
-- TAG-NZP-CSI-RS-RESOURCE-STOP
-- ASN1STOP
```

Figure 4A

```
-- ASN1START
-- TAG-CSI-RS-RESOURCEMAPPING-START

CSI-RS-ResourceMapping  ::=    SEQUENCE {
    frequencyDomainAllocation       CHOICE {
        row1                            BIT STRING (SIZE (4)),
        row2                            BIT STRING (SIZE (12)),
        row4                            BIT STRING (SIZE (3)),
        other                           BIT STRING (SIZE (6))
    },
    nrofPorts                       ENUMERATED {p1,p2,p4,p8,p12,p16,p24,p32},
    firstOFDMSymbolInTimeDomain     INTEGER (0..13),
    firstOFDMSymbolInTimeDomain2    INTEGER (2..12)
    OPTIONAL,   -- Need R
    cdm-Type                        ENUMERATED {noCDM, fd-CDM2, cdm4-FD2-TD2, cdm8-FD2-TD4},
    density                         CHOICE {
        dot5                            ENUMERATED {evenPRBs, oddPRBs},
        one                             NULL,
        three                           NULL,
        spare                           NULL
    },
    freqBand                        CSI-FrequencyOccupation,
    ...
}

-- TAG-CSI-RS-RESOURCEMAPPING-STOP
-- ASN1STOP
```

Figure 4B

```
SRS-ResourseSet  ::=        SEQUENCE {
    srs-ResourceSetId          SRS-ResourceSetId,
    srs-ResourceIdList         SEQUENCE (SIZE(1..maxNrofSRS-ResourcesPerSet))  OF
                               SRS-ResourceId
    resourceType    OPTIONAL,  -- Cond Setup
        aperiodic              CHOICE {
        aperiodicSRS-ResourceTrigger   SEQUENCE {
            csi-RS             INTEGER  (1..maxNrofSRS-TriggerStates-1),
                               NZP-CSI-RS-ResourceId
    OPTIONAL,  -- Cond NonCodebook
            csiRRSlotOffset    INTEGER  (0..4)  OPTIONAL,  -- Cond NonCodebook
            slotOffset         INTEGER  (1..32)
    OPTIONAL,  -- Need S
            ....
        ]]
        aperiodicSRS-ResourceTriggerList   SEQUENCE  (SIZE(1..maxNrofSRS-TriggerStates-2))
                                           OF INTEGER  (1..maxNrofSRS-TriggerStates-1)
    OPTIONAL  -- Need M
        ]]
    },
        periodic               SEQUENCE {
        associatedCSI-RS       NZP-CSI-RS-ResourceId
    OPTIONAL,  -- Cond NonCodebook
            ...
    }
    },
    antennaSwitching},
        alpha                  ENUMERATED {beamManagement, codebook, nonCodebook,
    OPTIONAL,  -- Need S
        p0                     Alpha
    Optional,  -- Need M
        srs-PowerControlAdjustmentStates   INTEGER  (-202..24)
    OPTIONAL  -- Need M
        ]]                     ENUMERATED  {  PathlossReferenceRSList-r16}
    }
```

Figure 8

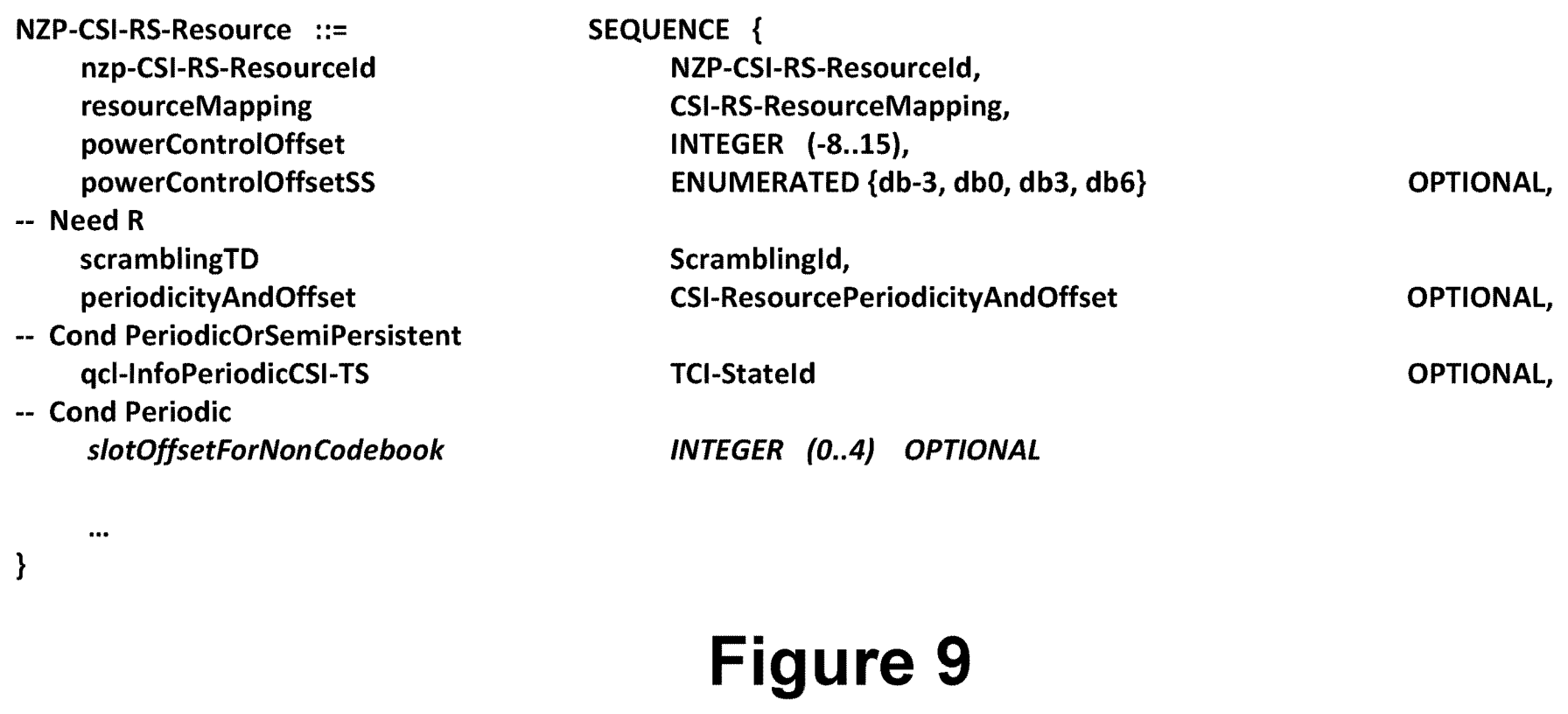

```
NZP-CSI-RS-Resource  ::=   SEQUENCE {
    nzp-CSI-RS-ResourceId               NZP-CSI-RS-ResourceId,
    resourceMapping                     CSI-RS-ResourceMapping,
    powerControlOffset                  INTEGER  (-8..15),
    powerControlOffsetSS                ENUMERATED {db-3, db0, db3, db6}
-- Need R
    scramblingTD                        ScramblingId,
    periodicityAndOffset                CSI-ResourcePeriodicityAndOffset           OPTIONAL,
-- Cond PeriodicOrSemiPersistent
    qcl-InfoPeriodicCSI-TS              TCI-StateId                                OPTIONAL,
-- Cond Periodic
    slotOffsetForNonCodebook            INTEGER  (0..4)   OPTIONAL

...
}
```

OPTIONAL,

OPTIONAL,

Figure 9

1800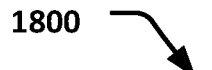

receiving repetitions of a downlink control information
(DCI) from multiple transmission-reception points (TRPs),
wherein the DCI is to trigger a channel state information
(CSI)-reference signal (RS) on a CSI-RS resource
associated with a sounding reference signal (SRS) resource
set
1802 identifying that a scheduling offset between the DCI and
the CSI-RS resource is less than a threshold
1804 determining, based on the identification, a default beam
for transmission of the CSI-RS
1806

Figure 18

1900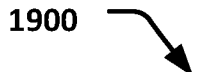

encoding, for transmission to a user equipment (UE), one or more repetitions of a downlink control information (DCI) that is transmitted from multiple transmission-reception points (TRPs), wherein the DCI is to trigger a channel state information (CSI)-reference signal (RS) on a CSI-RS resource associated with a sounding reference signal (SRS) resource set
1902 identifying that a scheduling offset between the DCI and the CSI-RS resource is less than a threshold
1904 determining, based on the identification, a default beam for transmission of the CSI-RS
1906 receiving the CSI-RS from the UE based on the default beam
1908

Figure 19

ENHANCED NON-CODEBOOK-BASED UPLINK TRANSMISSIONS IN WIRELESS CELLULAR NETWORK

CROSS REFERENCE TO RELATED APPLICATIONS

The present application is a national phase entry under 35 U.S.C. § 371 of International Application No. PCT/US2022/ 021673, filed Mar. 24, 2022, entitled "ENHANCED NON-CODEBOOK-BASED UPLINK TRANSMISSIONS IN WIRELESS CELLULAR NETWORK," which claims priority to International Patent Application No. PCT/CN2021/ 083162, which was filed Mar. 26, 2021; International Patent Application No. PCT/CN2021/085518, which was filed Apr. 5, 2021; International Patent Application No. PCT/CN2021/ 086597, which was filed Apr. 12, 2021; International Patent Application No. PCT/CN2021/093078, which was filed May 11, 2021 and International Patent Application No. PCT/CN2021/118105, which was filed Sep. 14, 2021, the entire disclosures of which are hereby incorporated by reference.

FIELD

Various embodiments generally may relate to the field of wireless communications. For example, some embodiments may relate to enhanced non-codebook-based uplink transmissions wireless cellular networks.

BACKGROUND

In the 3GPP New Radio (NR) Release (Rel)-15 specification, different types of sounding reference signal (SRS) resource sets are supported. The SRS resource set is configured with a parameter of "usage", which can be set to 'beamManagement', 'codebook', 'nonCodebook' or 'antennaSwitching'. The SRS resource set configured for 'beamManagement' is used for beam acquisition and uplink beam indication using SRS. The SRS resource set configured for 'codebook' and 'nonCodebook' is used to determine the uplink (UL) precoding with explicit indication by transmission precoding matrix index (TPMI) or implicit indication by SRS resource index (SRI). Finally, the SRS resource set configured for 'antennaSwitching' is used to acquire downlink (DL) channel state information (CSI) using SRS measurements in the user equipment (UE) by leveraging reciprocity of the channel in time-domain duplexing (TDD) systems. For SRS transmission, the time domain behavior may be periodic, semi-persistent or aperiodic.

BRIEF DESCRIPTION OF THE FIGURES

FIG. 1 illustrates an example of a radio resource control (RRC) message for SRS resource set configuration in accordance with various embodiments.

FIG. 3 illustrates an example of existing spec on CSI-reference signal (RS) for non-codebook based transmission in accordance with various embodiments.

FIGS. 4A-4B illustrate an example of RRC configuration for non-zero power (NZP)-CSI-RS-Resource and CSI-RS-Resource-Mapping in accordance with various embodiments.

FIG. 8 illustrates an example of adding CSI-RS slot offset to SRS resource set configuration in accordance with various embodiments.

FIG. 9 illustrates an example of adding CSI-RS slot offset to CSI-RS resource configuration in accordance with various embodiments.

FIG. 18 depicts an example procedure for practicing the various embodiments discussed herein.

FIG. 19 depicts another example procedure for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments herein provide techniques for enhanced non-codebook-based uplink transmissions wireless cellular networks. For example, embodiments include techniques to transmit multiple channel state information (CSI)-reference signal (RS) resources in different slots for non-Codebook based physical uplink shared channel (PUSCH) transmission in multi-transmission-reception point (TRP) operation.

FIG. 1 shows an RRC configuration for a SRS resource set. When an SRS resource set is configured as 'aperiodic', the SRS resource set also includes configuration of trigger state(s) (aperiodicSRS-ResourceTrigger, aperiodicSRS-ResourceTriggerList). The triggering state(s) defines which DCI codepoint(s) triggers the corresponding SRS resource set transmission.

The aperiodic SRS could be triggered via SRS Request field in DCI. SRS Request field could be carried by DCI format 0_1/0_2/1_1/1_2/2_3, wherein DCI format 0_1/0_2 is used for scheduling PUSCH, DCI format 1_1/1_2 is used for scheduling PDSCH and DCI format 2_3 is used to trigger aperiodic SRS for a group of UEs.

For non-codebook based transmission, the UE is configured with one SRS resource set consisting of one or multiple SRS resources. The 'usage' of the SRS resource set is set to 'nonCodebook'. And all the SRS resources are configured with only one antenna port. For non-codebook based transmission, the UE could be configured with one NZP (non zero power) CSI-RS resource associated with the SRS resource set. Based on measuring on the CSI-RS resource, the UE could calculate the precoder used for SRS transmission, e.g. for non-codebook based transmission, the SRS resources transmission for link adaptation is precoded. After measuring the SRS, the gNB could indicate one or several SRIs for PUSCH transmission. The UE should select the precoder for PUSCH according to the indicated SRIs. In FR2, the spatial relation for PUSCH transmission could be based on either SRI or the measurement on CSI-RS.

Figure 2:
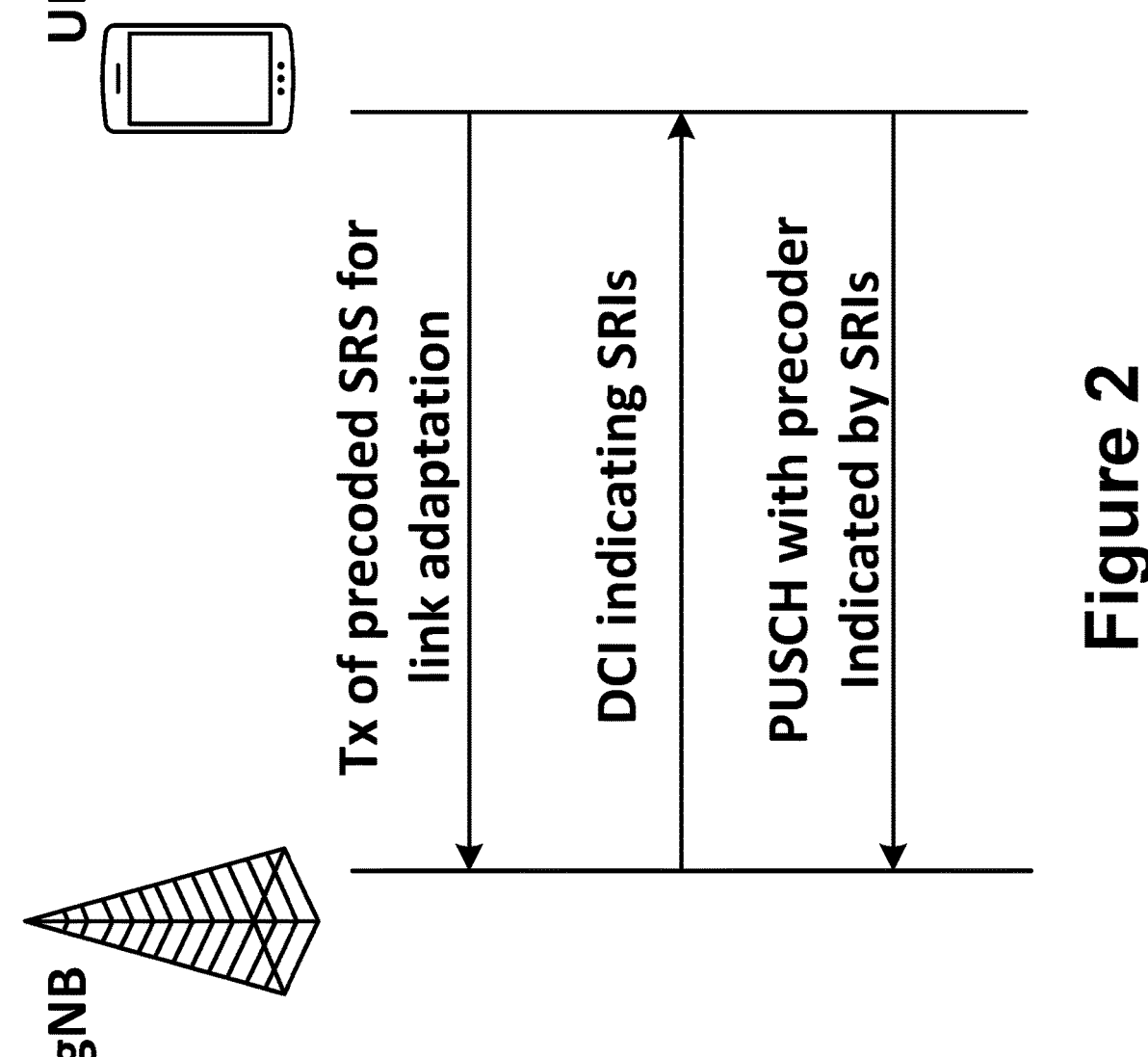
FIG. 2 illustrates an example of non-codebook based physical uplink shared channel (PUSCH) transmission in accordance with various embodiments.

FIG. 2 shows the operation of codebook based and non-codebook based PUSCH transmission.

In the Rel-15/Rel-16 spec, when the CSI-RS associated with non-codebook based transmission is transmitted within the same slot as the DCI which triggers the SRS transmission. FIG. 3 shows the existing spec on associated CSI-RS for non-codebook based transmission.

As shown in FIG. 1 and FIG. 3, the associated CSI-RS for non-codebook based PUSCH transmission is given by parameter csi-RS (for aperiodic SRS) or associatedCSI-RS (for periodic/semi-persistent SRS), which provides a NZP-CSI-RS-ResourceId identifying a NZP CSI-RS resource.

FIGS. 4A-4B show the RRC configuration for NZP-CSI-RS-Resource and CSI-RS-Resource-Mapping. It can be observed for NZP CSI-RS resource, the time domain position configuration (firstOFDMSymbolInTimeDomain, firstOFDMSymbolInTimeDomain2) is at OFDM symbol level.

Figure 5:
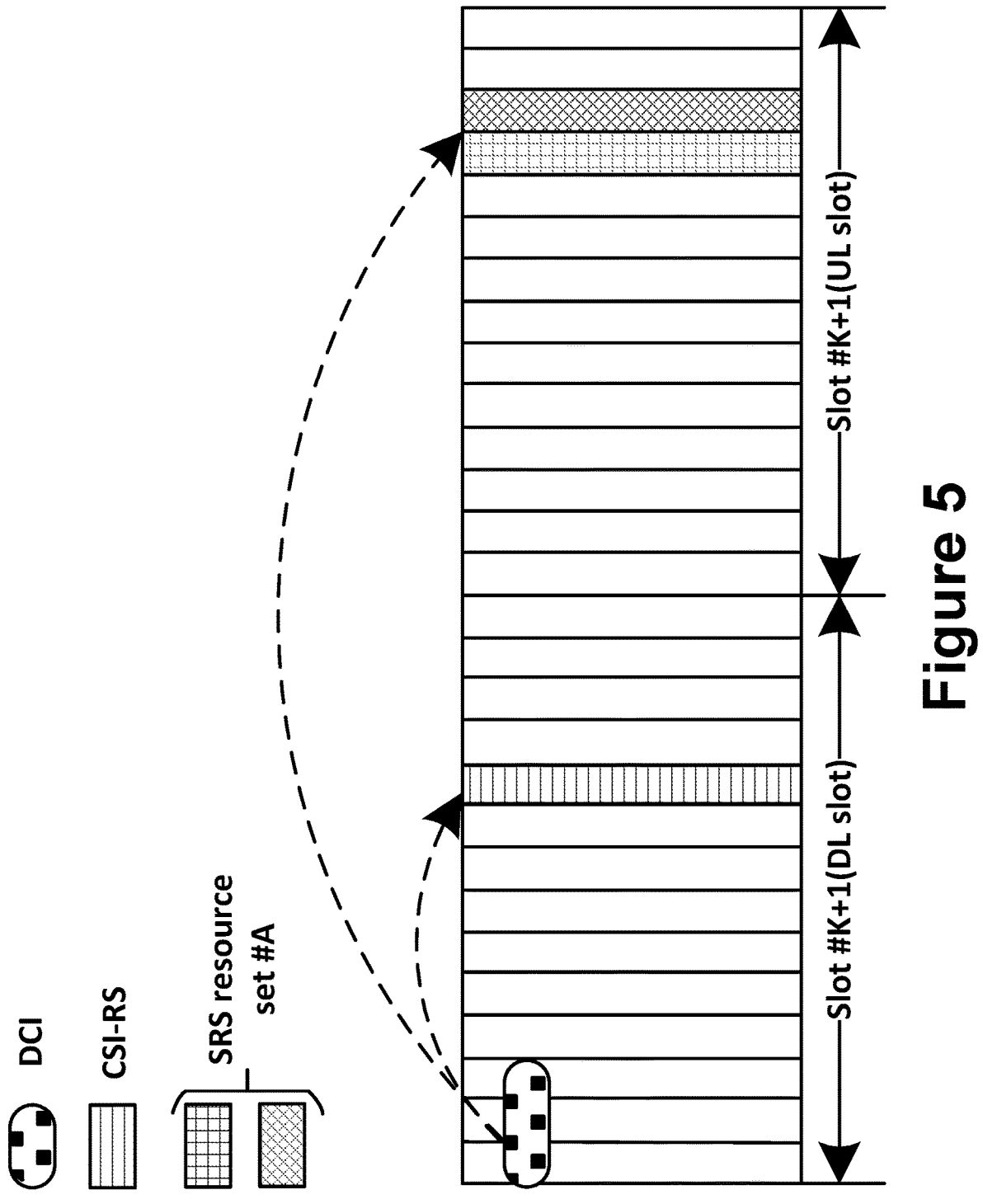
FIG. 5 illustrates an example of CSI-RS and SRS transmission for non-codebook based UL transmission in Rel-15/Rel-16 in accordance with various embodiments.

FIG. 5 further illustrates an example of the transmission of SRS for non-Codebook and associated CSI-RS.

Issues

In Rel-17, the uplink multi-TRP operation is supported. For non-codebook based PUSCH transmission, it has been agreed that the maximum number of SRS resource set is extended to two. It means two CSI-RS resources could be configured in total, with one CSI-RS is associated with one SRS resource set, e.g. each CSI-RS is sent from different TRP. If following Rel-16 spec for the CSI-RS time domain position, these two CSI-RS will be transmitted in the same slot with the DCI triggering SRS.

However, in FR2, when the UE receives CSI-RS associated with different SRS resource set/different TRP, the UE is expected to apply different spatial relations/beams for the reception, e.g. beam switching is expected. In this case, the time gap between two CSI-RS should consider the required beam switching time.

In addition, multi-panel UE is also considered in Rel-17, which doesn't support simultaneous transmission from multiple panels. Thus, the timing requirement should also consider the UE panel switching time.

Figure 6:
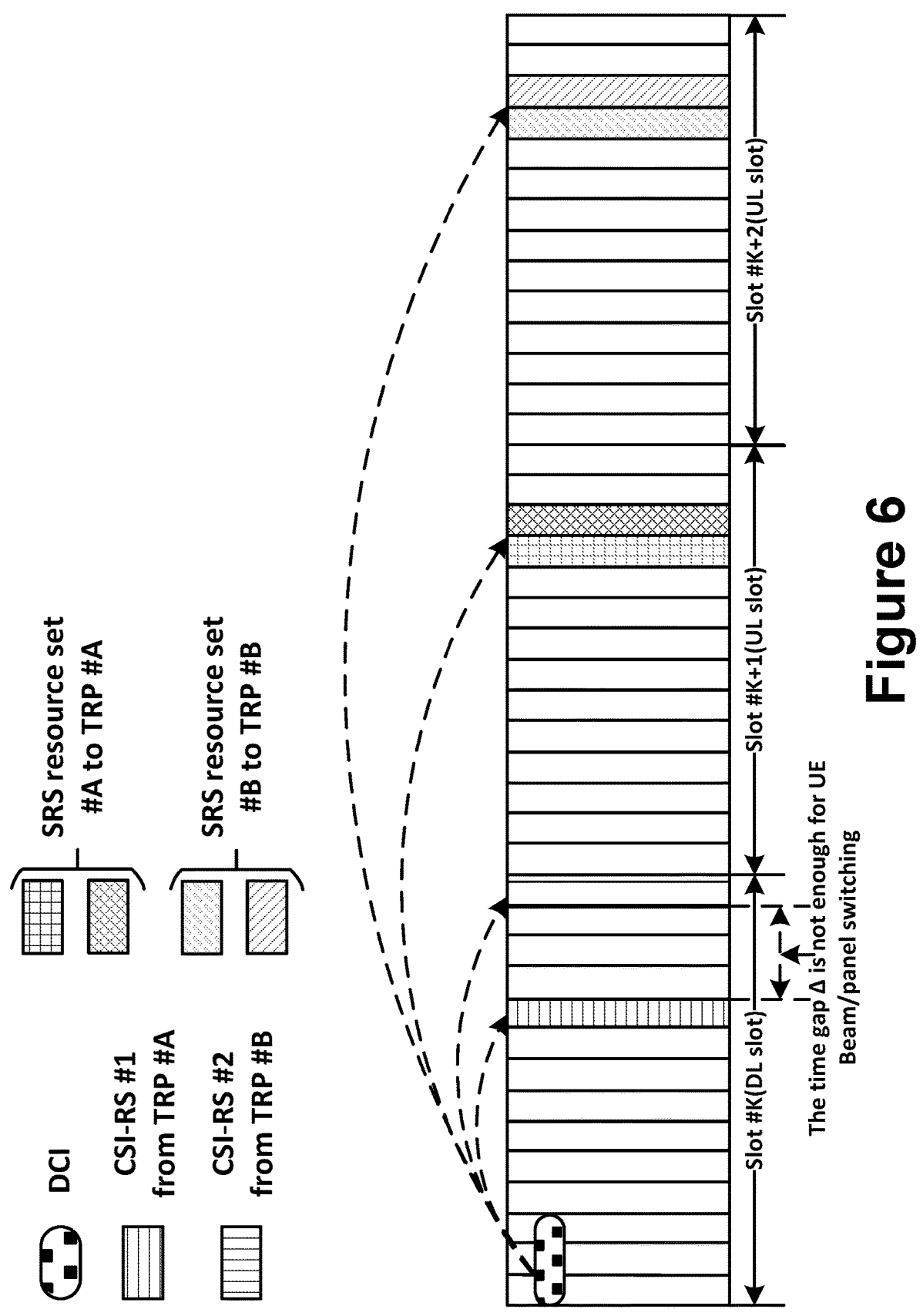
FIG. 6 illustrates an example an issue of CSI-RS transmission for non-Codebook based UL in multi- transmission-reception point (TRP) operation in accordance with various embodiments.

FIG. 6 illustrates an example of the issue in operation.

Various embodiments herein include techniques to transmit multiple CSI-RS resources in different slots for non-Codebook based PUSCH in multi-TRP. The embodiments may solve the issue described above.

The current CSI-RS transmission for non-codebook based PUSCH is not sufficient in multi-TRP scenario. Among other things, embodiments of the present disclosure are directed to the timing of CSI-RS transmission for non-codebook based PUSCH in multi-TRP scenario.

Scenario A: CSI-RS Transmission for Non-Codebook based UL in FR2

1. Slot Offset Configuration for CSI-RS

In an embodiment, for non-codebook based uplink transmission in multi-TRP, the multiple CSI-RS resources associated with different SRS resource set could be transmitted over different slots, so that the UE has sufficient time to switch beams and/or switch antenna panel.

Figure 7:
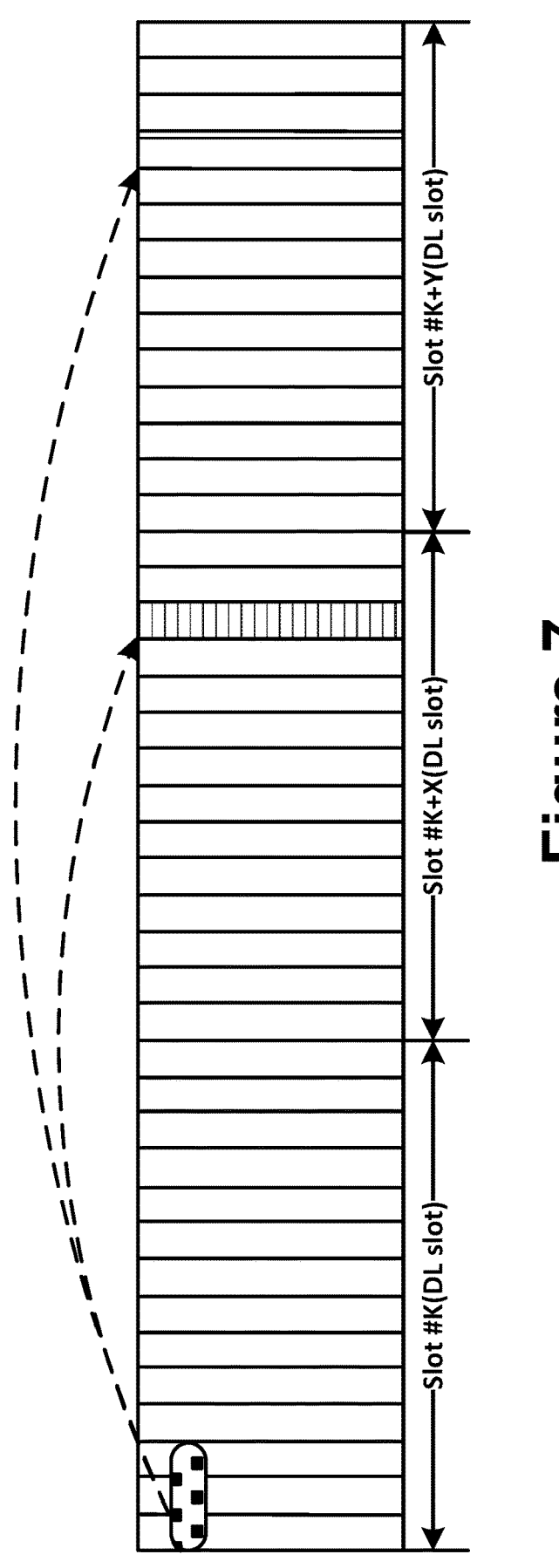
FIG. 7 illustrates an example of CSI-RS delivered over different slots for non-codebook based UL in multi-TRP in accordance with various embodiments.

The CSI-RS resource could be sent over a different slot with a configurable slot offset with reference to the DCI slot. For example, if the DCI triggering SRS for non-codebook based transmission is sent over slot K, then CSI-RS resource #1 from TRP #A is delivered over slot K+X (X>=0), and CSI-RS resource #2 from TRP #B is delivered over slot K+Y (Y>=0) and Y≠X). FIG. 7 shows an example of the operation.

In an embodiment, for non-codebook based UL in multi-TRP, the slot offset of CSI-RS resource with reference to the DCI slot could be configured by RRC.

In an example, the slot offset of CSI-RS could be configured to SRS resource set. An example of the spec change is shown in FIG. 8, wherein a new parameter csiRSSlotOffset is added into SRS-ResourceSet.

In an example, the slot offset of CSI-RS could be configured to NZP CSI-RS resource. An example of the spec change is shown in FIG. 9, wherein a new parameter slotOffsetForNonCodebook is added into NZP-CSI-RS-Resource.

In another embodiment, regarding the slot offset of CSI-RS configured by RRC, it could be interpreted to indicate an available slot after the slot carrying DCI triggering the SRS for non-codebook based UL transmission. One slot is defined as 'available slot' for CSI-RS if the slot is:

A downlink (DL) slot

A flexible slot and the OFDM symbol positions configured for CSI-RS are downlink (DL) symbol(s) or flexible symbol(s)

For example, if the slot offset configured for CSI-RS is 2, then it means the $2^{nd}$ available slot after the slot carrying DCI.

Figure 10:
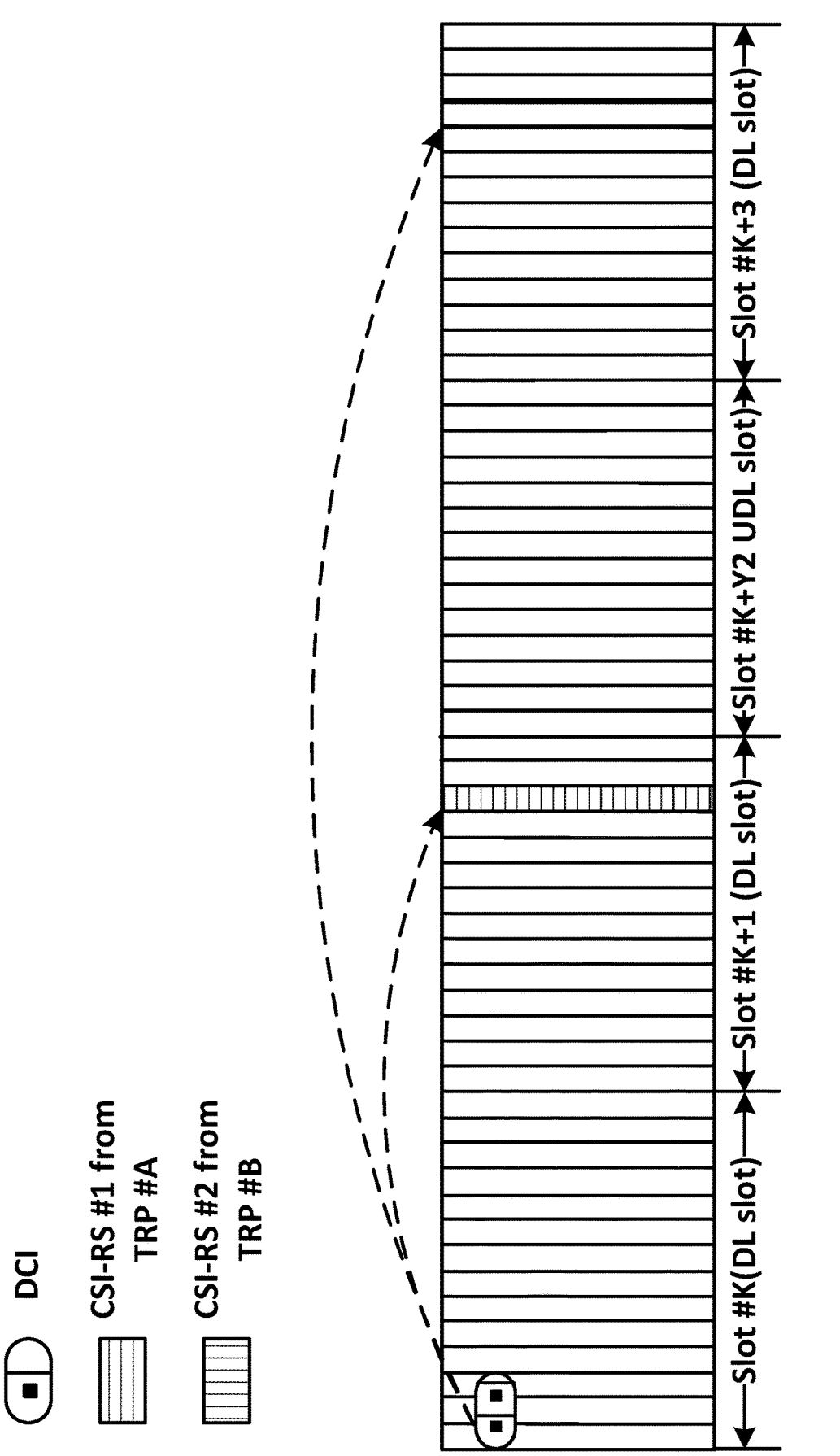
FIG. 10 illustrates an example of available slot indicated by slot offset for CSI-RS in accordance with various embodiments.

FIG. 10 shows an example of the operation. In the example, CSI-RS #1 is from TRP #A and configured with slot offset of 1. CSI-RS #2 is from TRP #B and configured with slot offset of 2. In the example, CSI-RS #1 is transmitted over the $1^{st}$ available slot after DCI slot (slot K), e.g.

CSI-RS#1 is transmitted in slot K+1. Since slot K+2 is UL slot, it is not counted as available slot. Therefore, CSI-RS #2 is transmitted over the $2^{nd}$ available slot after slot K, e.g. CSI-RS #2 is sent over slot K+3.

In another example, the slot offset of CSI-RS could be indicated by legacy RRC parameter slotOffset, if it is not used for SRS. The slotOffset could be used to indicate an available slot for CSI-RS.

In another embodiment, the slot offset of CSI-RS transmission for non-codebook based UL in multi-TRP could be dynamically updated by MAC-CE or dynamically indicated by DCI. A new MAC-CE could be introduced to update the slot offset for CSI-RS.

If the CSI-RS slot offset is dynamically indicated by DCI, a new field should be introduced to DCI format that could trigger SRS (DCI format 0_1/0_2/1_1/1_2/2_3). The new field could indicate the slot offset for one CSI-RS resource or for two CSI-RS resources.

In another example, if SRS is triggered by DCI format 0_1/0_2 without scheduling PUSCH, then some un-used bits could be repurposed to indicate the slot offset for one or two CSI-RS resource(s).

In another example, the slot offset of CSI-RS could be jointly indicated by RRC+DCI, or RRC+MAC-CE. For example, if the slot offset configured by RRC is K1 and the slot offset indicated by DCI is K2, then the final slot offset for the CSI-RS is K1+K2.

In this embodiment, the slot offset could also be interpreted as an available slot.

In another embodiment, for the associated CSI-RS included in the SRS resource set configured with usage of non-codebook, the slot offset of the associated CSI-RS could be predefined with reference to the slot carrying the DCI. For example, the DCI triggering aperiodic SRS resource set for non-codebook is sent over slot #K, the CSI-RS is sent over slot #K+L, where the value of L is predefined. The predefined slot offset for the associated CSI-RS could indicate a slot after the triggering DCI or an available slot after the triggering DCI. One slot is defined as "available slot" for CSI-RS if the slot is a downlink slot, or if the slot is:

A downlink (DL) slot

A flexible slot and the OFDM symbol positions configured for CSI-RS are downlink (DL) symbol(s) or flexible symbol(s)

In multi-TRP operation with two SRS resource sets configured for non-codebook based transmission, in order to distribute the associated CSI-RS over different slot, two predefined slot offset values for CSI-RS should be defined. For SRS resource set #A for non-codebook, the predefined slot offset for the CSI-RS #1 associated with SRS resource set #A is L1, and for SRS resource set #B for non-codebook, the predefined slot offset for the CSI-RS #2 associated with SRS resource set #B is L2.

In another example, in multi-TRP operation, two SRS resource sets are configured for non-codebook based transmission, SRS resource set #A and SRS resource set #B. If single SRS resource set for non-codebook is triggered by the DCI, then the predefined slot offset value L0 is applied for the associated CSI-RS, no matter whether it is SRS resource set #A or SRS resource set #B. If both SRS resource sets for non-codebook is triggered by the DCI, then there is a mapping between the predefined slot offset values (L1 and L2, L1 may equal to L0, L2 may equal to LO, but L1 doesn't equal to L2) and the associated CSI-RS. In one example, the mapping is defined by the SRS resource set ID, e.g. the CSI-RS associated with lower SRS resource set ID will apply L1 and the CSI-RS associated with higher SRS resource set ID will apply L2. In another example, the mapping is defined by the associated TRP (implicitly indicated by the SRS power control adjustment state), e.g. the CSI-RS associated with the $1^{st}$ TRP will apply L1, and the CSI-RS associated with the $2^{nd}$ TRP will apply L2.

In another embodiment, in multi-TRP operation with two SRS resource sets configured for non-codebook based transmission, a common slot offset, L', could be pre-defined for the associated CSI-RS, wherein the common slot offset is used for both SRS resource sets. The predefined common slot offset L' could indicate a slot after the triggering DCI or an available slot after the triggering DCI. One slot is defined as 'available slot' for CSI-RS if the slot is a downlink slot, or if the slot is:

A downlink (DL) slot

A flexible slot and the OFDM symbol positions configured for CSI-RS are downlink (DL) symbol(s) or flexible symbol(s)

And in SRS resource set, the RRC parameter slotOffset-ForNonCodebook could be introduced with a value of J (J>=0). The total slot offset for the associated CSI-RS is given by L'+J. Assuming the triggering DCI is sent over slot #K, then the associated CSI-RS will be transmitted over slot #K+L+J.

In another example, the parameter slotOffsetForNonCodebook could indicate a slot or an available slot after slot #K+L'. One slot is defined as 'available slot' for CSI-RS if the slot is a downlink slot, or if the slot is:

A downlink (DL) slot

A flexible slot and the OFDM symbol positions configured for CSI-RS are downlink (DL) symbol(s) or flexible symbol(s)

In multi-TRP operation with two SRS resource sets configured for non-codebook based transmission, different values of slotOffsetForNonCodebook should be configured for different SRS resource sets for non-codebook.

In another embodiment, for SRS resource set configured with usage of non-codebook, if it is triggered by DCI and it is configured with associated CSI-RS, when determining the available slot for the SRS, the reference slot should be the slot where the CSI-RS is transmitted. For example, the DCI triggering aperiodic SRS resource set for non-codebook is sent over slot #K, the CSI-RS is sent over slot #K+L, then the slot #K+L should be the reference slot to determine the available slot for the triggered SRS. If the SRS is configured with the available slot of value M, then it means that SRS will be transmitted in the M-th (or [M+1]-th if M ranges from 0) available slot after the reference slot #K+L.

In another example, when determining available slot for the SRS, the reference slot could be indicated by the legacy RRC parameter slotOffset for SRS (for DCI sent over #K, the slotOffset of value N indicates a slot of #K+N). For SRS with usage of non-codebook, the value of slotOffset should be equal to or larger than the time offset between the triggering DCI and the associated CSI-RS. For example, the DCI is sent over slot #K, CSI-RS is sent over slot #K+L, then the value (N) of slotOffset should be equal to or larger than L, e.g. N>=L. In another example, the slotOffset for SRS indicates an available slot for SRS after the triggering DCI or indicates an available slot for SRS after the slot carrying the CSI-RS.

In another example, the definition of available slot for SRS should be changed to consider the associated CSI-RS for non-codebook. E.g. for SRS configured with usage of non-codebook and configured with associated CSI-RS, one slot is an available slot for SRS if the slot is:

After the slot carrying the associated CSI-RS, and

An uplink (UL) slot or a flexible slot, wherein the OFDM symbol positions in the flexible slot configured for SRS are uplink (UL) symbol(s) or flexible symbol(s)

In another embodiment, in multi-TRP operation with two SRS resource sets configured for non-codebook based transmission, the reference slot to determine available slot for SRS could be defined individually for each SRS resource set. For example, for SRS resource set #A, the reference slot is the slot carrying the associated CSI-RS #1, and for SRS resource set #B, the reference slot is the slot carrying the associated CSI-RS #2.

In another example, if the two SRS resource sets for non-codebook are configured with the same trigger state, e.g. could be triggered by the same DCI, then a common reference slot could be utilized. In one example, the reference slot could be the smaller slot carrying the associated CSI-RS, in another example, the reference slot could be the larger slot carrying the associated CSI-RS.

In another embodiment, in multi-TRP, for the multiple (two) SRS resource sets configured with usage of non-codebook, the UE is not expected to receive one DCI triggers multiple (two) SRS resource sets. E.g. in multi-TRP, only one SRS resource set configured with usage of non-codebook can be triggered by a single DCI.

2. Timing Requirement for CSI-RS Transmission

In an embodiment, assuming the required time of UE beam switching is T1 OFDM symbols, the required time of UE antenna panel switching is T2 OFDM symbols, and the required time for the UE to decode DCI is T3 OFDM symbols, wherein T1, T2 and T3 is up to UE capability, the timing requirement for CSI-RS transmission could be different in different cases.

Case-A: Two SRS Resource Set Triggered

Figure 11:
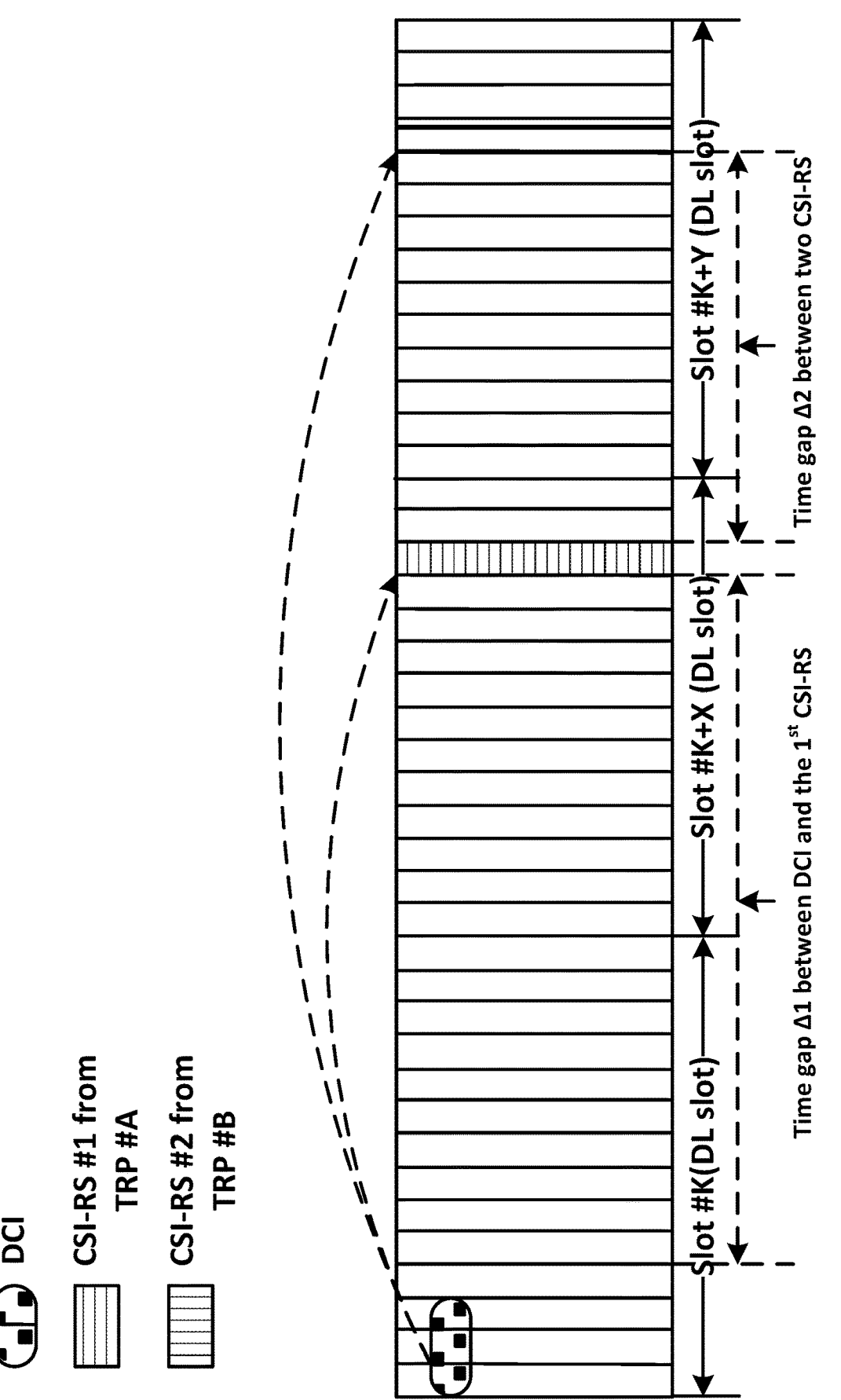
FIG. 11 illustrates an example of a time gap if two SRS resource sets are triggered by same DCI in accordance with various embodiments.

In an embodiment, if two SRS resource sets for non-codebook based transmission are triggered, then two time gaps should be considered as shown in FIG. 11.

For the time gap Δ1 which is between DCI and the $1^{st}$ CSI-RS, if DCI and the $1^{st}$ CSI-RS is from the same TRP, then there is no requirement on Δ1. The $1^{st}$ CSI-RS could be sent over the same slot as the DCI slot. In another example, the time gap Al should be larger than the DCI decoding time T3.

If DCI and the $1^{st}$ CSI-RS is sent by different TRP, then the time gap Δ1 should be larger than the UE beam switching time (T1) and/or UE antenna panel switching time (T2). In another example, the time gap Δ1 should be larger than the UE beam switching time (T1) and/or UE antenna panel switching time (T2), plus the DCI decoding time T3.

In another example, no matter whether the DCI and the $1^{st}$ CSI-RS are sent from the same TRP or not, the time gap Δ1 should be larger than a common threshold, wherein threshold could be up to UE capability.

For the time gap Δ2 which is between the two CSI-RS resources, it should be larger than the UE beam switching time (T1) and/or UE antenna panel switching time (T2).

In another embodiment, in order to reduce the UE beam switching/panel switching, if multiple SRS resource sets are triggered for non-codebook based PUSCH in multi-TRP, the UE should be configured to send the $1^{st}$ SRS resource set associated with the $1^{st}$ CSI-RS after the $1^{st}$ CSI-RS is sent by the network side. And the transmission of the $1^{st}$ SRS resource set should be prior to the $2^{nd}$ CSI-RS.

Case-B: Single SRS Resource Set Triggered

Figure 12:
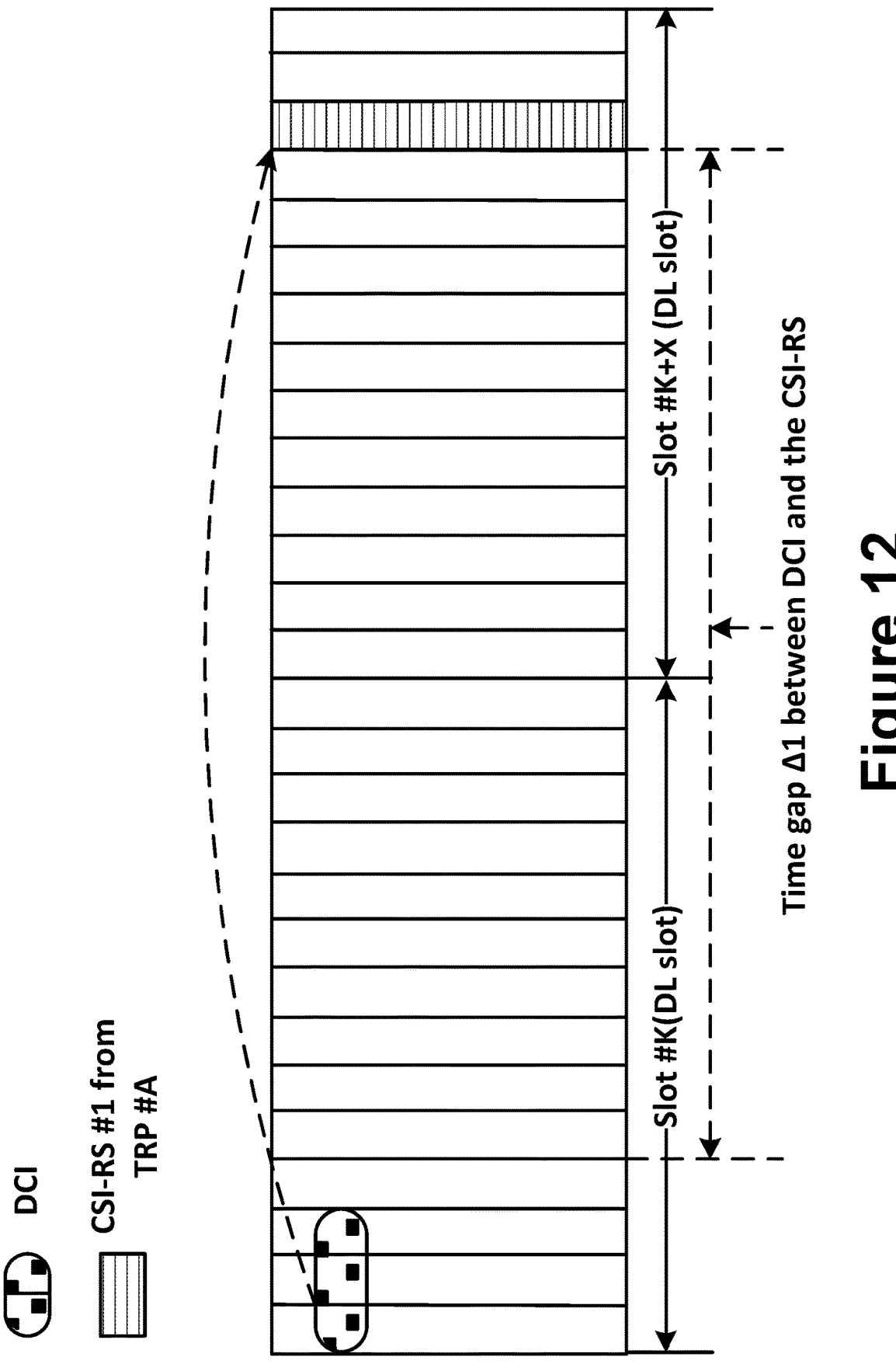
FIG. 12 illustrates an example of a time gap if single SRS resource set is triggered in accordance with various embodiments.

In an embodiment, if single SRS resource set for non-codebook based transmission is triggered, then one time gaps should be considered as shown in FIG. 12.

For the time gap Δ1 which is between DCI and CSI-RS, if DCI and the CSI-RS is from the same TRP, then there is no requirement on Δ1. The CSI-RS could be sent over the same slot as the DCI slot. In another example, the time gap Δ1 should be larger than the DCI decoding time T3.

If DCI and the CSI-RS is sent by different TRP, then the time gap Δ1 should be larger than the UE beam switching time (TI) and/or UE antenna panel switching time (T2). In another example, the time gap Δ1 should be larger than the UE beam switching time (T1) and/or UE antenna panel switching time (T2), plus the DCI decoding time T3.

In another example, no matter whether the DCI and the CSI-RS are sent from the same TRP or not, the time gap Δ1 should be larger than a common threshold, wherein the threshold could be up to UE capability.

In another embodiment, it could be restricted that for non-codebook based PUSCH in multi-TRP, only one SRS resource set is triggered by one DCI. In addition, the DCI and the associated CSI-RS should be sent by the same TRP. In this case, the associated CSI-RS resource could be sent over the same slot as the DCI.

Scenario B: CSI-RS Transmission for
Non-Codebook based UL in FR1

In an embodiment, for FR1, since there is no UE beam switching/panel switching, the multiple CSI-RS resources associated with non-codebook based PUSCH could be transmitted over the same slot as the DCI triggering SRS. E.g. slot offset for CSI-RS is not configured or the configurable slot offset for CSI-RS is set to zero.

In another embodiment, for FR1, if multiple SRS resource sets are triggered for non-codebook based PUSCH in multi-TRP, the associated multiple CSI-RS resources can also be distributed over different slot. For example, if the CSI-RS has a lot of antenna ports, then it's difficult to transmit multiple CSI-RS within the same slot.

Scenario C: Beam Configuration for CSI-RS and
SRS in Non-Codebook based UL Transmission in
FR2

In an embodiment, for non-codebook based transmission, if the SRS resource set is configured with associated CSI-RS, when the DCI indicates joint DL/UL TCI state, the indicated joint DL/UL TCI state could be applied for the transmission of associated CSI-RS in downlink, but it is not applied for SRS transmission in uplink. For SRS transmission, it should follow the spatial relation obtained by measuring the associated CSI-RS.

In another example, if the joint DL/UL TCI state is indicated, the indicated joint DL/UL TCI state could be used for both CSI-RS transmission and SRS transmission.

In another example, if the UE can be indicated joint DL/UL TCI state and it can be used for SRS transmission for non-codebook, then the UE should not be configured with associated CSI-RS for non-codebook SRS.

In another embodiment, for non-codebook based transmission, if the SRS resource set is configured with associated CSI-RS, when the DCI indicates separate DL/UL TCI state, the indicated separate DL TCI state could be applied for the transmission of associated CSI-RS in downlink, but the indicated separate UL TCI state is not applied for SRS transmission in uplink. For SRS transmission, it should follow the spatial relation obtained by measuring the associated CSI-RS.

In another example, if the separate DL/UL TCI state is indicated, the indicated separate DL TCI state could be applied for the transmission of associated CSI-RS in downlink, and the indicated separate UL TCI state could be applied for SRS transmission in uplink.

In another example, if the UE can be indicated separate DL/UL TCI state and the separate UL TCI state can be used for SRS transmission for non-codebook, the UE should not be configured with associated CSI-RS for non-codebook SRS.

In another embodiment, if the UE is configured with associated CSI-RS for non-codebook SRS, then the joint DL/UL TCI state, separate DL/UL TCI state should not be configured with qcl-Type set to typed. Or if the UE is configured with associated CSI-RS for non-codebook SRS, then the UE should not be configured joint DL/UL TCI state or separate DL/UL TCI state. Or if the UE is configured with associated CSI-RS for non-codebook SRS, then the joint DL/UL TCI state or separate DL/UL TCI state is not applied for SRS configured with non-codebook.

In another embodiment, for non-codebook based transmission in multi-TRP, if the SRS resource set is configured with associated CSI-RS, then multiple joint DL/UL TCI states or multiple separate DL TCI states, e.g. 2, should be indicated for CSI-RS transmission, e.g. one TCI state for each CSI-RS.

In another embodiment, for non-codebook based transmission in multi-TRP, if the SRS resource set is not configured with associated CSI-RS, then multiple joint DL/UL TCI states or multiple separate UL TCI states, e.g. 2, should be indicated for SRS transmission, e.g. one TCI state for each SRS resource set.

In another embodiment, if the SRS for non-codebook based transmission is triggered by DCI format 0_1/0_2 without scheduling PUSCH and with/without CSI Request, then some un-used fields could be reused to indicate the joint DL/UL TCI state, separate DL/UL TCI state for the CSI-RS and/or SRS transmission.

Scenario D: Default Beam Operation

1. PDCCH Repetition is not Enabled

Single SRS Resource Set is Triggered

In an embodiment, in multi-TRP operation, if PDCCH repetition is not enabled and single SRS resource set for non-codebook is triggered, when the scheduling offset between the triggering DCI and the CSI-RS is smaller than certain threshold (up to UE capability), a default beam should be applied for the triggered CSI-RS. The default beam could be determined via predefined rules.

Alt 1: If there is other DL signal with indicated TCI state, wherein the DL signal is transmitted over the same OFDM symbol as the CSI-RS, then the QCL assumption of other DL signal is applied for CSI-RS. Otherwise, one of the following alternatives could be applied.

Alt 2: The default beam for the triggered CSI-RS follows the TCI state of the CORESET/search space carrying the triggering DCI.

Alt 3: The default beam for the triggered CSI-RS follows the TCI state of a specific CORESET/search space, e.g. the CORESET/search space with the lowest ID.

Alt 4: If the PDSCH is indicated with two TCI states, then one of the TCI state could be applied for CSI-RS. In one example, the first TCI state of PDSCH corresponding to the lowest TCI codepoint among those mapped to two TCI states is applied for CSI-RS. In another example, the first TCI state of the active PDSCH TCI states is applied for CSI-RS.

In another embodiment, in multi-TRP operation, if PDCCH repetition is not enabled and single SRS resource set for non-codebook is triggered, when the scheduling offset between the triggering DCI and the CSI-RS is smaller than certain threshold (up to UE capability), the CSI-RS and the triggering DCI should be sent from the same TRP.

Multiple SRS Resource Sets are Triggered

In an embodiment, in multi-TRP operation, if PDCCH repetition is not enabled and multiple SRS resource sets (e.g. 2) for non-codebook are triggered, when the scheduling offset between the triggering DCI and one CSI-RS is smaller than certain threshold (up to UE capability), a default beam should be applied for the triggered CSI-RS. The default beam could be determined via predefined rules.

Alt 1: If there is other DL signal with indicated TCI state, wherein the DL signal is transmitted over the same OFDM symbol as the CSI-RS, then the QCL assumption of other DL signal is applied for CSI-RS. Otherwise, one of the following alternatives could be applied.

Alt 2: The default beam for the triggered CSI-RS follows the TCI state of the CORESET/search space carrying the triggering DCI.

Alt 3: The default beam for the triggered CSI-RS follows the TCI state of a specific CORESET/search space, e.g. the CORESET/search space with the lowest ID.

Alt 4: If the PDSCH is indicated with two TCI states, then one of the TCI state could be applied for CSI-RS. In one example, the first TCI state of PDSCH corresponding to the lowest TCI codepoint among those mapped to two TCI states is applied for CSI-RS. In another example, the first TCI state of the active PDSCH TCI states is applied for CSI-RS.

In another embodiment, in multi-TRP operation, if PDCCH repetition is not enabled and multiple SRS resource sets (e.g. 2) for non-codebook are triggered, when the scheduling offset between the triggering DCI and both CSI-RS is smaller than certain threshold (up to UE capability), a default beam should be applied for the both of the triggered CSI-RS. The default beam could be determined via predefined rules.

Alt 1: If there is other DL signal with indicated TCI state, wherein the DL signal is transmitted over the same OFDM symbol as the CSI-RS, then the QCL assumption of other DL signal is applied for CSI-RS. Otherwise, one of the following alternatives could be applied.

Alt 2: The default beam for the one specific triggered CSI-RS, e.g. the first triggered CSI-RS, follows the TCI state of the CORESET/search space carrying the triggering DCI.

Alt 3: If the PDSCH is indicated with two TCI states, then the two TCI state could be applied for both triggered CSI-RS. In one example, the first TCI state of PDSCH corresponding to the lowest TCI codepoint among those mapped to two TCI states is applied for the first triggered CSI-RS; the second TCI state of PDSCH corresponding to the lowest TCI codepoint among those mapped to two TCI states is applied for the second triggered CSI-RS. In another example, the first TCI state of the active PDSCH TCI states is applied for the first triggered CSI-RS, and the second TCI state of the active PDSCH TCI states is applied for the second triggered CSI-RS.

In another embodiment, in multi-TRP operation, if PDCCH repetition is not enabled and multiple (e.g. 2) SRS resource sets for non-codebook are triggered, when the scheduling offset between the triggering DCI and one CSI-RS is smaller than certain threshold (up to UE capability), the CSI-RS and the triggering DCI should be sent from the same TRP. When the scheduling offset between the triggering DCI and both CSI-RS is smaller than certain threshold (up to UE capability), the first CSI-RS and the triggering DCI should be sent from the same TRP.

2. PDCCH Repetition is Enabled

Single SRS Resource Set is Triggered

In an embodiment, in multi-TRP operation, if PDCCH repetition is enabled and single SRS resource set for non-codebook is triggered, when the scheduling offset between the triggering DCI and the CSI-RS is smaller than certain threshold (up to UE capability), a default beam should be applied for the triggered CSI-RS. The default beam could be determined via predefined rules.

Alt 1: If there is other DL signal with indicated TCI state, wherein the DL signal is transmitted over the same OFDM symbol as the CSI-RS, then the QCL assumption of other DL signal is applied for CSI-RS. Otherwise, one of the following alternatives could be applied.

Figure 13:
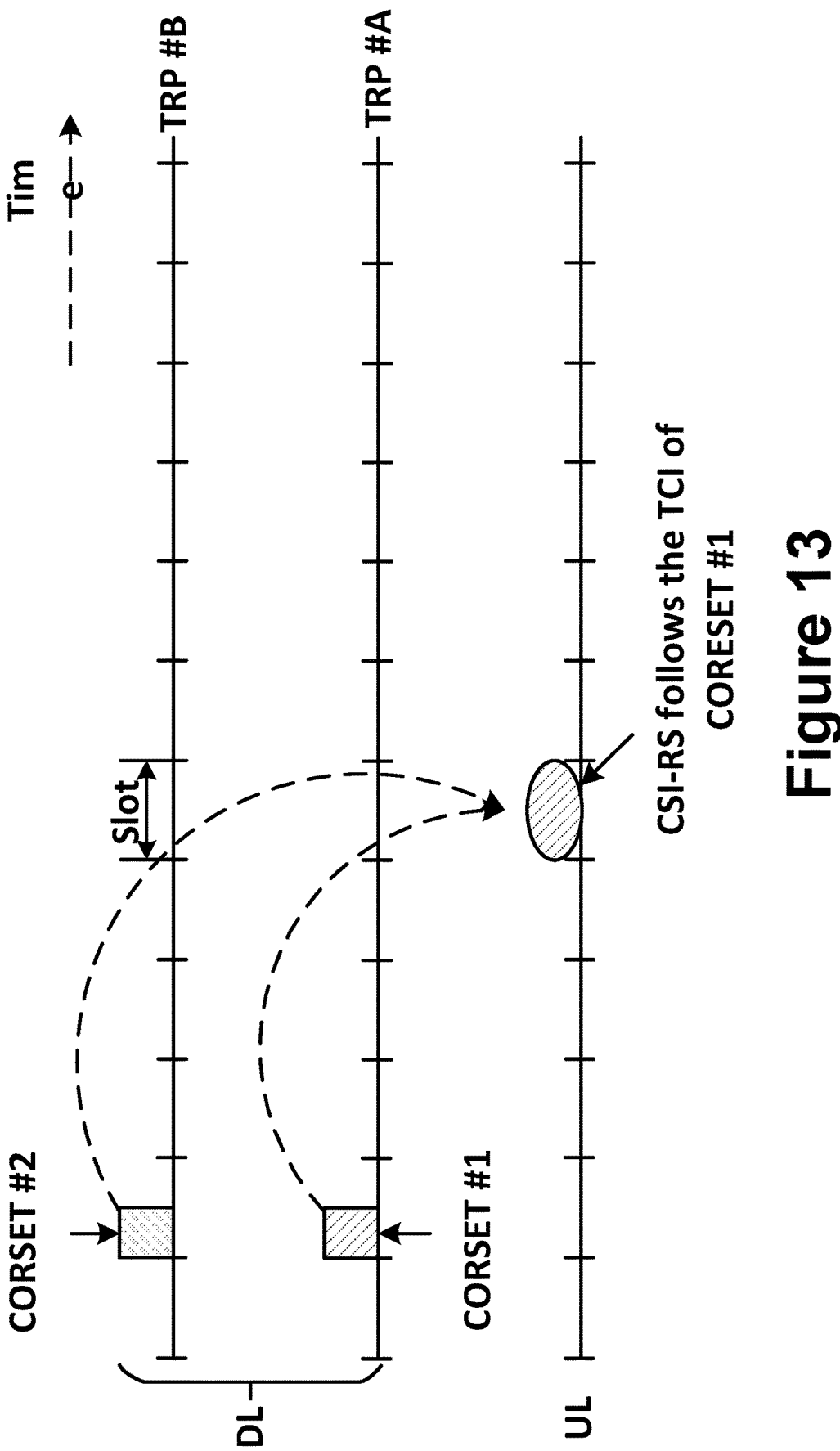
FIG. 13 illustrates an example of default beam for CSI-RS if physical downlink control channel (PDCCH) repetition is enabled, in accordance with various embodiments.

Alt 2: The default beam for the triggered CSI-RS follows the TCI state of one specific of the CORESET/search space carrying the triggering DCI. In one example, the TCI state of the CORESET with lower ID among the multiple CORESETs transmitting PDCCH repetitions is applied for CSI-RS. FIG. 13 shows an example of the operation.

Alt 3: The default beam for the triggered CSI-RS follows the TCI state of a specific CORESET/search space. e.g. the CORESET/search space with the lowest ID.

Alt 4: If the PDSCH is indicated with two TCI states, then one of the TCI state could be applied for CSI-RS. In one example, the first TCI state of PDSCH corresponding to the lowest TCI codepoint among those mapped to two TCI states is applied for CSI-RS. In another example, the first TCI state of the active PDSCH TCI states is applied for CSI-RS.

In another embodiment, in multi-TRP operation, if PDCCH repetition is enabled and single SRS resource set for non-codebook is triggered, when the scheduling offset between the triggering DCI and the CSI-RS is smaller than certain threshold (up to UE capability), the CSI-RS and the CORESET with lower ID sending the triggering DCI should be sent from the same TRP.

In another embodiment, in multi-TRP operation, if inter-slot PDCCH repetition is enabled and single SRS resource set for non-codebook is triggered, the associated CSI-RS should be located to a specific slot if the slot offset is not configured for the associated CSI-RS. For example, the CSI-RS should be transmitted in the slot carrying the first PDCCH repetition. In another example, the CSI-RS should be transmitted in the slot carrying the last PDCCH repetition.

For non-codebook based transmission, in the case of inter-slot PDCCH repetition, the associated CSI-RS and the PDCCH repetition located in the same slot as the CSI-RS should be sent from the same TRP.

In another embodiment, in multi-TRP operation, if inter-slot PDCCH repetition is enabled and single SRS resource set for non-codebook is triggered, if the associated CSI-RS is configured with slot offset, then the reference slot to determine the slot to transmit the CSI-RS should be one specific slot carrying PDCCH repetition. The CSI-RS should be transmitted after all the PDCCH repetition. In one example, the reference slot should be slot carrying the first PDCCH repetition. In another example, the reference slot should be the slot carrying the last PDCCH repetition.

In another embodiment, in multi-TRP operation, if inter-slot PDCCH repetition is enabled and single SRS resource set for non-codebook is triggered, the reference slot for SRS transmission should be a specific slot carrying the PDCCH repetition. In one example, the reference slot should be slot carrying the first PDCCH repetition. In another example, the reference slot should be the slot carrying the last PDCCH repetition. The SRS should be transmitted after all the PDCCH repetitions and after the associated CSI-RS.

Note: this embodiment could also be applied to other SRS usages

Multiple SRS Resource Sets are Triggered

In an embodiment, in multi-TRP operation, if PDCCH repetition is enabled and multiple (e.g. 2) SRS resource sets for non-codebook are triggered, when the scheduling offset between the triggering DCI and one CSI-RS is smaller than certain threshold (up to UE capability), a default beam should be applied for the triggered CSI-RS. The default beam could be determined via predefined rules.

Alt 1: If there is other DL signal with indicated TCI state, wherein the DL signal is transmitted over the same OFDM symbol as the CSI-RS, then the QCL assumption of other DL signal is applied for CSI-RS. Otherwise, one of the following alternatives could be applied.

Alt 2: The default beam for the triggered CSI-RS follows the TCI state of one specific of the CORESET/search space carrying the triggering DCI. In one example, the TCI state of the CORESET with lower ID among the multiple CORESETs transmitting PDCCH repetitions is applied for CSI-RS.

Alt 3: The default beam for the triggered CSI-RS follows the TCI state of a specific CORESET/search space, e.g. the CORESET/search space with the lowest ID.

Alt 4: If the PDSCH is indicated with two TCI states, then one of the TCI state could be applied for CSI-RS. In one example, the first TCI state of PDSCH corresponding to the lowest TCI codepoint among those mapped to two TCI states is applied for CSI-RS. In another example, the first TCI state of the active PDSCH TCI states is applied for CSI-RS.

In another embodiment, in multi-TRP operation, if PDCCH repetition is enabled and multiple (e.g. 2) SRS resource sets for non-codebook are triggered, when the scheduling offset between the triggering DCI and both CSI-RS is smaller than certain threshold (up to UE capability), a default beam should be applied for both of the triggered CSI-RS. The default beam could be determined via predefined rules.

Alt 1: If there is other DL signal with indicated TCI state, wherein the DL signal is transmitted over the same OFDM symbol as the CSI-RS, then the QCL assumption of other DL signal is applied for CSI-RS. Otherwise, one of the following alternatives could be applied.

Figure 14:
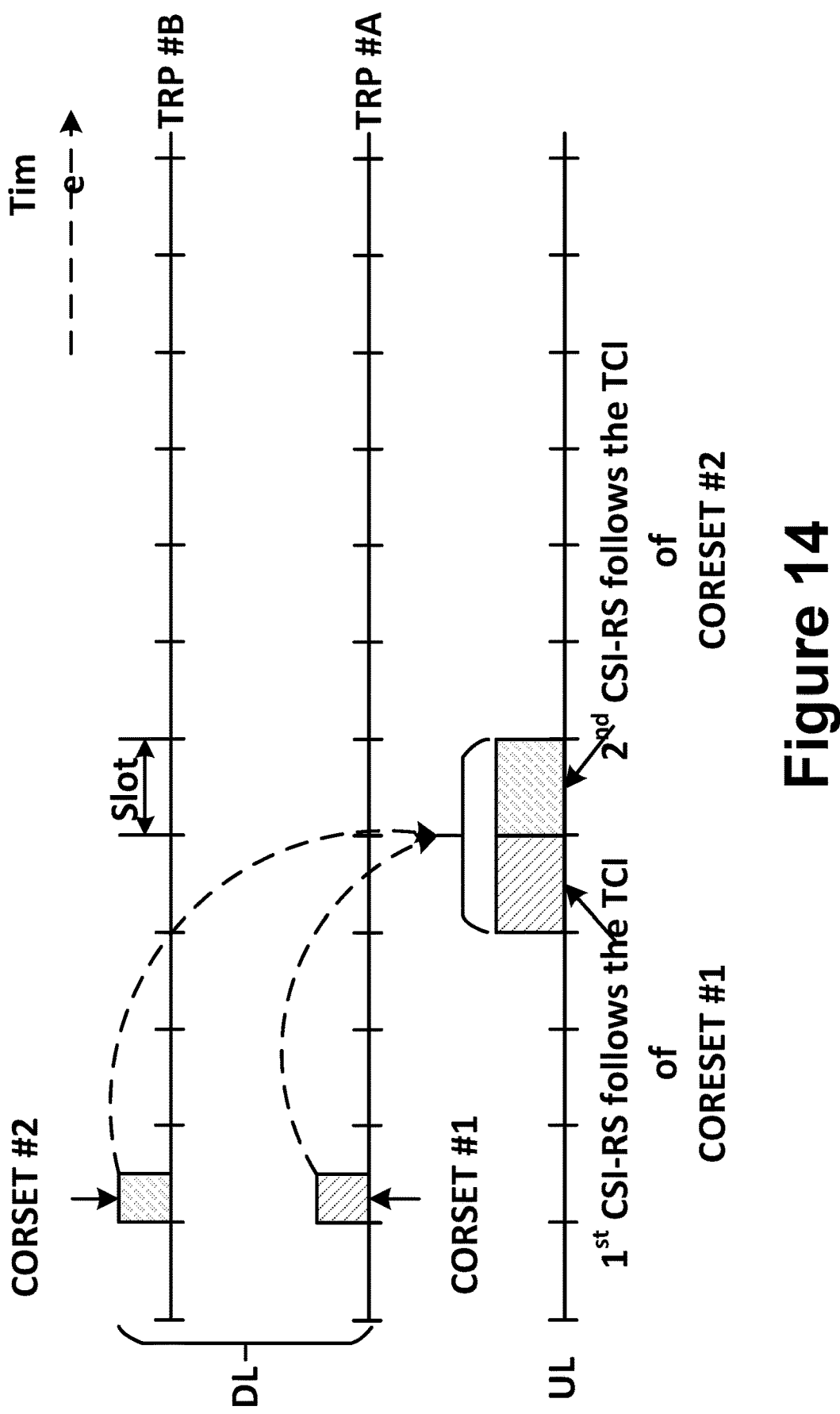
FIG. 14 illustrates an example of default beam for CSI-RS if PDCCH repetition is enabled and multiple CSI-RS are triggered, in accordance with various embodiments.

Alt 2: The default beam for the triggered CSI-RS follows the TCI states of the CORESET/search space carrying the triggering DCI. In one example, the TCI state of the CORESET with lower ID among the multiple CORESETs transmitting PDCCH repetitions is applied for the first triggered CSI-RS; and the TCI state of the CORE-SET with higher ID among the multiple CORESETs transmitting PDCCH repetitions is applied for the second triggered CSI-RS. FIG. 14 shows an example of the operation.

Alt 3: If the PDSCH is indicated with two TCI states, then the TCI state for PDSCH could be applied for CSI-RS. In one example, the first TCI state of PDSCH corresponding to the lowest TCI codepoint among those mapped to two TCI states is applied for the first CSI-RS; the second TCI state of PDSCH corresponding to the lowest TCI codepoint among those mapped to two TCI states is applied for the second CSI-RS. In another example, the first TCI state of the active PDSCH TCI states is applied for the first CSI-RS; the second TCI state of the active PDSCH TCI states is applied for the second CSI-RS.

In another embodiment, in multi-TRP operation, if PDCCH repetition is enabled and multiple (e.g. 2) SRS resource sets for non-codebook are triggered, when the scheduling offset between the triggering DCI and one CSI-RS is smaller than certain threshold (up to UE capability), the CSI-RS and the CORESET with lower ID sending the triggering DCI should be sent from the same TRP. When the scheduling offset between the triggering DCI and both CSI-RS is smaller than certain threshold (up to UE capability), the first CSI-RS and the CORESET with lower ID sending the triggering DCI should be sent from the same TRP.

In another embodiment, if associated CSI-RS is configured for SRS with non-codebook, and if the PDCCH repetition is enabled, then the scheduling offset between the triggering DCI and CSI-RS should be larger than or equal to the threshold to apply the default beam for CSI-RS.

In another embodiment, if associated CSI-RS is configured for SRS with non-codebook, then the PDCCH repetition or inter-slot PDCCH repetition is not applied.

In another embodiment, in multi-TRP operation, if inter-slot PDCCH repetition is enabled and multiple (e.g. 2) SRS resource set for non-codebook are triggered, the associated CSI-RS resources should be located to a specific slot if the slot offset is not configured for the associated CSI-RS. For example, the CSI-RS should be transmitted in the slot carrying the first PDCCH repetition. In another example, the CSI-RS should be transmitted in the slot carrying the last PDCCH repetition.

For non-codebook based transmission, in the case of inter-slot PDCCH repetition, the associated CSI-RS and the PDCCH repetition located in the same slot as the CSI-RS should be sent from the same TRP.

In one example, the associated CSI-RS resources could be located in the same slot or different slot. For example, the first CSI-RS is located in the slot carrying the first PDCCH repetition, wherein the first CSI-RS and the first PDCCH repetition are from the same TRP (the first TRP). The second CSI-RS is located in the slot carrying the last PDCCH repetition, wherein the second CSI-RS and the last PDCCH repetition are from the same TRP (the second TRP).

In another embodiment, in multi-TRP operation, if inter-slot PDCCH repetition is enabled and multiple (e.g. 2) SRS resource set for non-codebook is triggered, if the associated CSI-RS is configured with slot offset, then the reference slot to determine the slot to transmit the CSI-RS should be one specific slot carrying PDCCH repetition. The CSI-RS should be transmitted after all the PDCCH repetition. In one example, the reference slot should be slot carrying the first PDCCH repetition. In another example, the reference slot should be the slot carrying the last PDCCH repetition.

In another embodiment, in multi-TRP operation, if inter-slot PDCCH repetition is enabled and multiple (e.g. 2) SRS resource set for non-codebook is triggered, the reference slot for SRS transmission should be a specific slot carrying the PDCCH repetition. In one example, the reference slot should be slot carrying the first PDCCH repetition. In another example, the reference slot should be the slot carrying the last PDCCH repetition. The SRS should be transmitted after all the PDCCH repetitions and after the associated CSI-RS.

Note: this embodiment could also be applied to other SRS usages.

Note: All the embodiments on default beam in this section (Scenario D) may additionally or alternatively be applied for aperiodic CSI-RS in other cases, e.g. it is not limited to the associated CSI-RS for non-codebook.

Systems and Implementations

Figure 15:
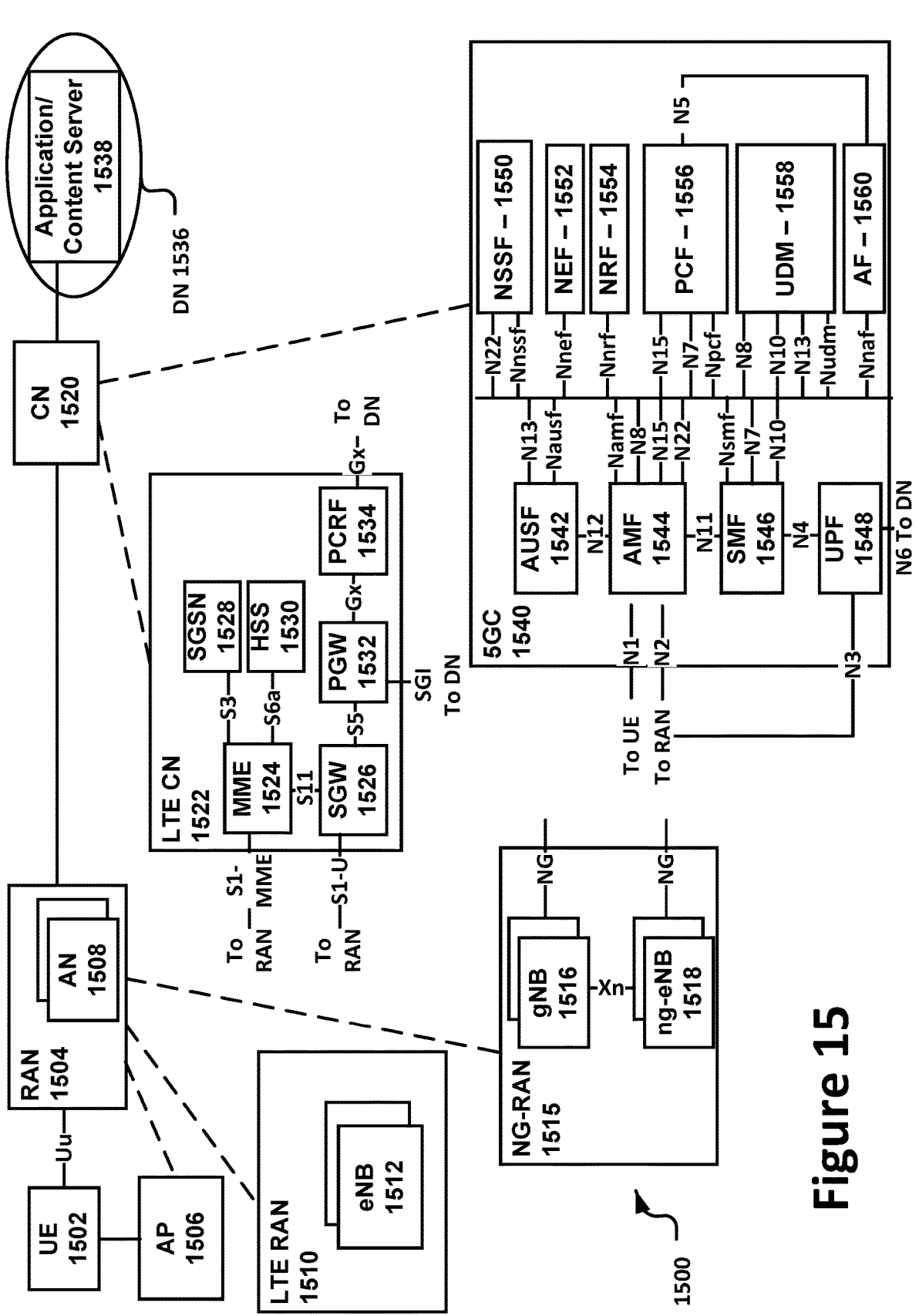
FIG. 15 illustrates a network in accordance with various embodiments.
Figure 16:
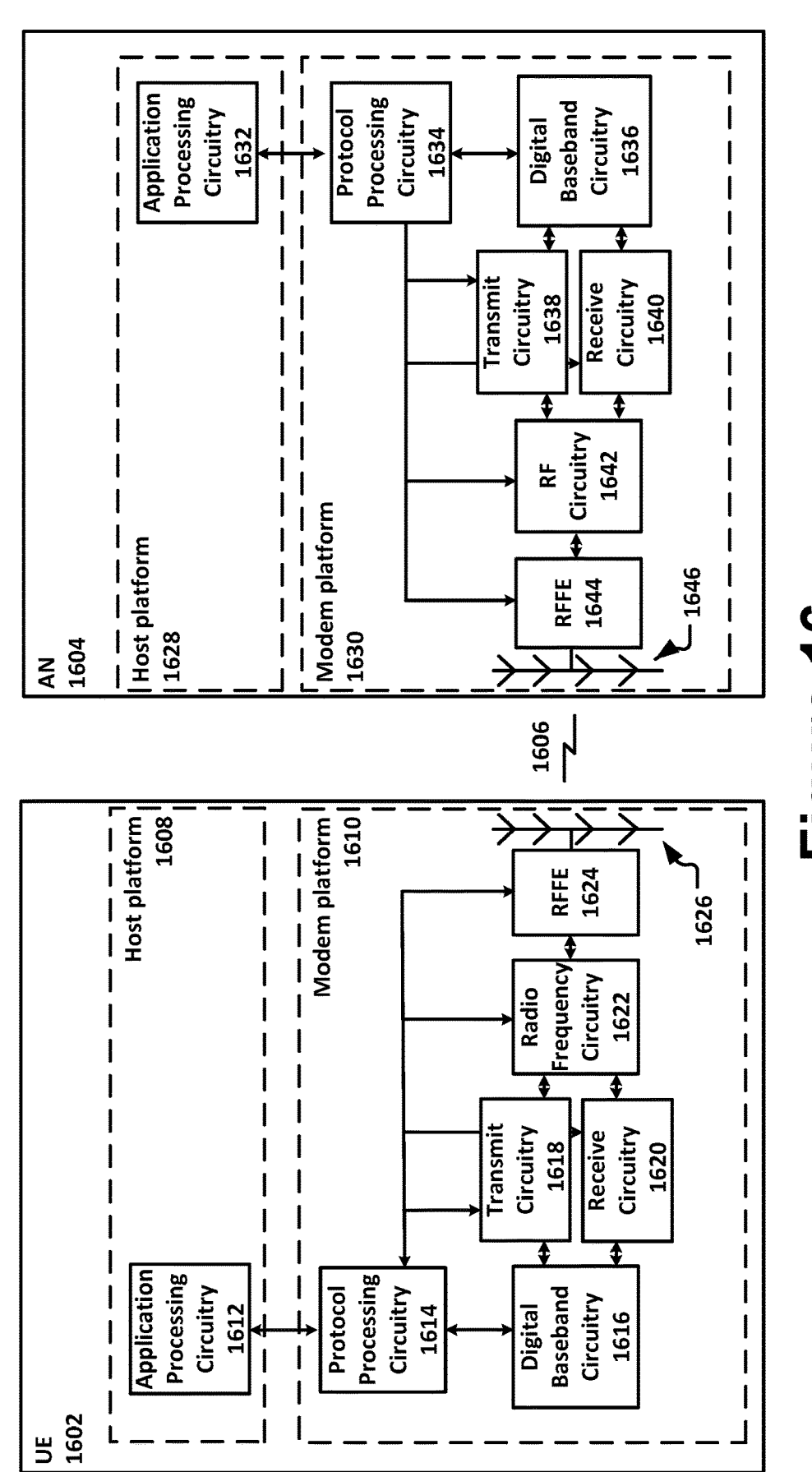
FIG. 16 schematically illustrates a wireless network in accordance with various embodiments.
Figure 17:
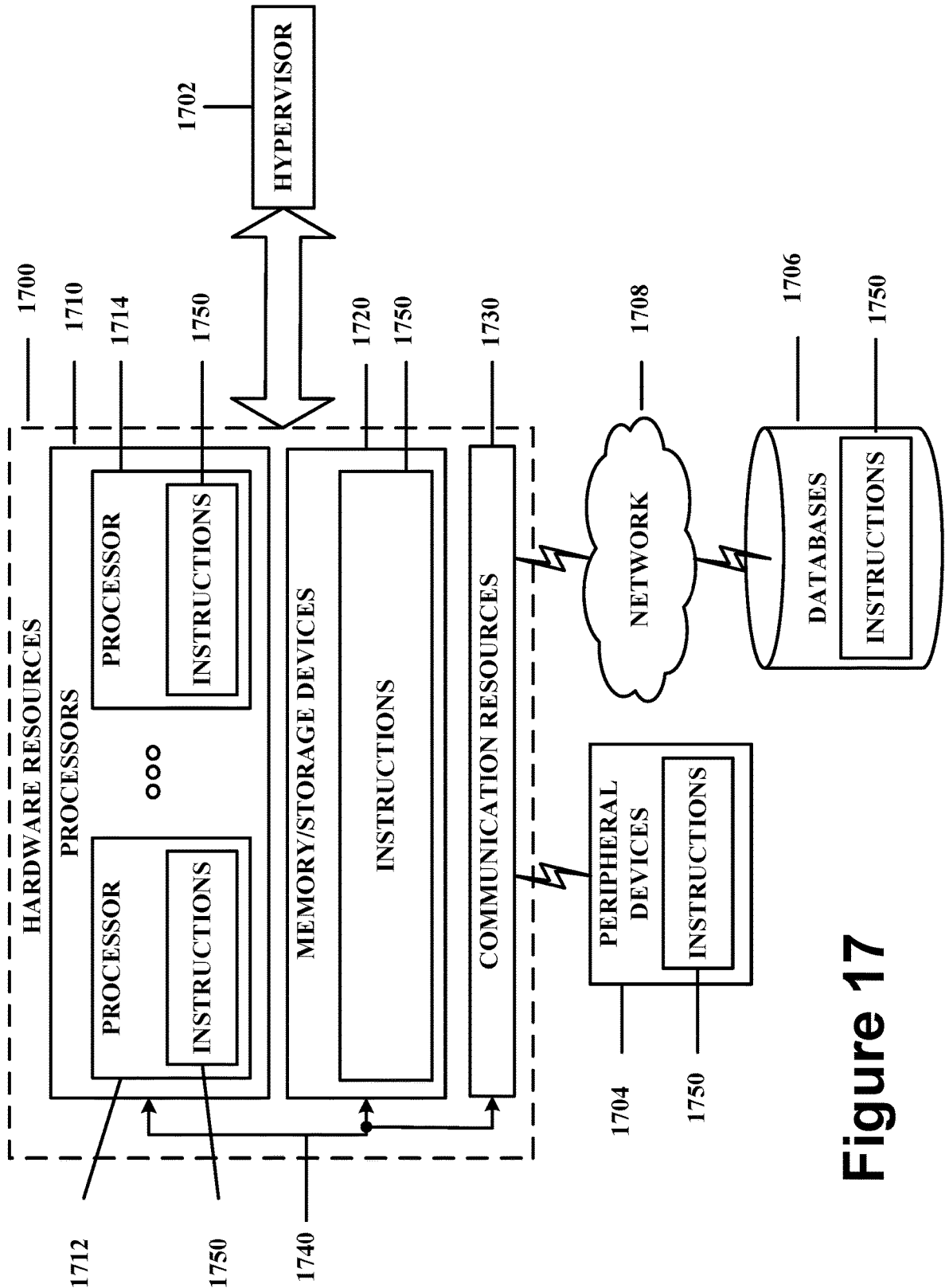
FIG. 17 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 15-17 illustrate various systems, devices, and components that may implement aspects of disclosed embodiments.

FIG. 15 illustrates a network 1500 in accordance with various embodiments. The network 1500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1500 may include a UE 1502, which may include any mobile or non-mobile computing device designed to communicate with a RAN 1504 via an over-the-air connection. The UE 1502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1502 may additionally communicate with an AP 1506 via an over-the-air connection. The AP 1506 may manage a WLAN connection, which may serve to offload some/all network traffic from the RAN 1504. The connection between the UE 1502 and the AP 1506 may be consistent with any IEEE 802.11 protocol, wherein the AP 1506 could be a wireless fidelity (Wi-Fi®) router. In some embodiments, the UE 1502, RAN 1504, and AP 1506 may utilize cellular-WLAN aggregation (for example, LWA/LWIP). Cellular-WLAN aggregation may involve the UE 1502 being configured by the RAN 1504 to utilize both cellular radio resources and WLAN resources.

The RAN 1504 may include one or more access nodes, for example, AN 1508. AN 1508 may terminate air-interface protocols for the UE 1502 by providing access stratum protocols including RRC, PDCP, RLC, MAC, and L1 protocols. In this manner, the AN 1508 may enable data/voice connectivity between CN 1520 and the UE 1502. In some embodiments, the AN 1508 may be implemented in a discrete device or as one or more software entities running on server computers as part of, for example, a virtual network, which may be referred to as a CRAN or virtual baseband unit pool. The AN 1508 be referred to as a BS, gNB, RAN node, eNB, ng-eNB, NodeB, RSU, TRxP, TRP, etc. The AN 1508 may be a macrocell base station or a low power base station for providing femtocells, picocells or other like cells having smaller coverage areas, smaller user capacity, or higher bandwidth compared to macrocells.

In embodiments in which the RAN 1504 includes a plurality of ANs, they may be coupled with one another via an X2 interface (if the RAN 1504 is an LTE RAN) or an Xn interface (if the RAN 1504 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1504 may each manage one or more cells, cell groups, component carriers, etc. to provide the UE 1502 with an air interface for network access. The UE 1502 may be simultaneously connected with a plurality of cells provided by the same or different ANs of the RAN 1504. For example, the UE 1502 and RAN 1504 may use carrier aggregation to allow the UE 1502 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1502 or AN 1508 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1504 may be an LTE RAN 1510 with eNBs, for example, eNB 1512. The LTE RAN 1510 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1504 may be an NG-RAN 1514 with gNBs, for example, gNB 1516, or ng-eNBs, for example, ng-eNB 1518. The gNB 1516 may connect with 5G-enabled UEs using a 5G NR interface. The gNB 1516 may connect with a 5G core through an NG interface, which may include an N2 interface or an N3 interface. The ng-eNB 1518 may also connect with the 5G core through an NG interface, but may connect with a UE via an LTE air interface. The gNB 1516 and the ng-eNB 1518 may connect with each other over an Xn interface.

In some embodiments, the NG interface may be split into two parts, an NG user plane (NG-U) interface, which carries traffic data between the nodes of the NG-RAN 1514 and a UPF 1548 (e.g., N3 interface), and an NG control plane (NG-C) interface, which is a signaling interface between the nodes of the NG-RAN 1514 and an AMF 1544 (e.g., N2 interface).

The NG-RAN 1514 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1502 can be configured with multiple BWPs where each BWP configuration has a different SCS. When a BWP change is indicated to the UE 1502, the SCS of the transmission is changed as well. Another use case example of BWP is related to power saving. In particular, multiple BWPs can be configured for the UE 1502 with different amount of frequency resources (for example, PRBs) to support data transmission under different traffic loading scenarios. A BWP containing a smaller number of PRBs can be used for data transmission with small traffic load while allowing power saving at the UE 1502 and in some cases at the gNB 1516. A BWP containing a larger number of PRBs can be used for scenarios with higher traffic load.

The RAN 1504 is communicatively coupled to CN 1520 that includes network elements to provide various functions to support data and telecommunications services to customers/subscribers (for example, users of UE 1502). The components of the CN 1520 may be implemented in one physical node or separate physical nodes. In some embodiments, NFV may be utilized to virtualize any or all of the functions provided by the network elements of the CN 1520 onto physical compute/storage resources in servers, switches, etc. A logical instantiation of the CN 1520 may be referred to as a network slice, and a logical instantiation of a portion of the CN 1520 may be referred to as a network sub-slice.

In some embodiments, the CN 1520 may be an LTE CN 1522, which may also be referred to as an EPC. The LTE CN 1522 may include MME 1524, SGW 1526, SGSN 1528, HSS 1530, PGW 1532, and PCRF 1534 coupled with one another over interfaces (or "reference points") as shown. Functions of the elements of the LTE CN 1522 may be briefly introduced as follows.

The MME 1524 may implement mobility management functions to track a current location of the UE 1502 to facilitate paging, bearer activation/deactivation, handovers, gateway selection, authentication, etc.

The SGW 1526 may terminate an S1 interface toward the RAN and route data packets between the RAN and the LTE CN 1522. The SGW 1526 may be a local mobility anchor point for inter-RAN node handovers and also may provide an anchor for inter-3GPP mobility. Other responsibilities may include lawful intercept, charging, and some policy enforcement.

The SGSN 1528 may track a location of the UE 1502 and perform security functions and access control. In addition, the SGSN 1528 may perform inter-EPC node signaling for mobility between different RAT networks; PDN and S-GW selection as specified by MME 1524; MME selection for handovers; etc. The S3 reference point between the MME 1524 and the SGSN 1528 may enable user and bearer information exchange for inter-3GPP access network mobility in idle/active states.

The HSS 1530 may include a database for network users, including subscription-related information to support the network entities handling of communication sessions. The HSS 1530 can provide support for routing/roaming, authentication, authorization, naming/addressing resolution, location dependencies, etc. An S6a reference point between the HSS 1530) and the MME 1524 may enable transfer of subscription and authentication data for authenticating/authorizing user access to the LTE CN 1520.

The PGW 1532 may terminate an SGi interface toward a data network (DN) 1536 that may include an application/content server 1538. The PGW 1532 may route data packets between the LTE CN 1522 and the data network 1536. The PGW 1532 may be coupled with the SGW 1526 by an S5 reference point to facilitate user plane tunneling and tunnel management. The PGW 1532 may further include a node for policy enforcement and charging data collection (for example, PCEF). Additionally, the SGi reference point between the PGW 1532 and the data network 1536 may be an operator external public, a private PDN, or an intra-operator packet data network, for example, for provision of IMS services. The PGW 1532 may be coupled with a PCRF 1534 via a Gx reference point.

The PCRF 1534 is the policy and charging control element of the LTE CN 1522. The PCRF 1534 may be communicatively coupled to the app/content server 1538 to determine appropriate QoS and charging parameters for service flows. The PCRF 1532 may provision associated rules into a PCEF (via Gx reference point) with appropriate TFT and QCI.

In some embodiments, the CN 1520 may be a 5GC 1540. The 5GC 1540 may include an AUSF 1542, AMF 1544, SMF 1546, UPF 1548, NSSF 1550, NEF 1552, NRF 1554, PCF 1556, UDM 1558, and AF 1560 coupled with one another over interfaces (or "reference points") as shown. Functions of the elements of the 5GC 1540 may be briefly introduced as follows.

The AUSF 1542 may store data for authentication of UE 1502 and handle authentication-related functionality. The AUSF 1542 may facilitate a common authentication framework for various access types. In addition to communicating with other elements of the 5GC 1540 over reference points as shown, the AUSF 1542 may exhibit an Nausf service-based interface.

The AMF 1544 may allow other functions of the 5GC 1540 to communicate with the UE 1502 and the RAN 1504 and to subscribe to notifications about mobility events with respect to the UE 1502. The AMF 1544 may be responsible for registration management (for example, for registering UE 1502), connection management, reachability management, mobility management, lawful interception of AMF-related events, and access authentication and authorization. The AMF 1544 may provide transport for SM messages between the UE 1502 and the SMF 1546, and act as a transparent proxy for routing SM messages. AMF 1544 may also provide transport for SMS messages between UE 1502 and an SMSF. AMF 1544 may interact with the AUSF 1542 and the UE 1502 to perform various security anchor and context management functions. Furthermore, AMF 1544 may be a termination point of a RAN CP interface, which may include or be an N2 reference point between the RAN 1504 and the AMF 1544; and the AMF 1544 may be a termination point of NAS (N1) signaling, and perform NAS ciphering and integrity protection. AMF 1544 may also support NAS signaling with the UE 1502 over an N3 IWF interface.

The SMF 1546 may be responsible for SM (for example, session establishment, tunnel management between UPF 1548 and AN 1508); UE IP address allocation and management (including optional authorization); selection and control of UP function; configuring traffic steering at UPF 1548 to route traffic to proper destination; termination of interfaces toward policy control functions; controlling part of policy enforcement, charging, and QoS; lawful intercept (for SM events and interface to L1 system); termination of SM parts of NAS messages; downlink data notification; initiating AN specific SM information, sent via AMF 1544 over N2 to AN 1508; and determining SSC mode of a session. SM may refer to management of a PDU session, and a PDU session or "session" may refer to a PDU connectivity service that provides or enables the exchange of PDUs between the UE 1502 and the data network 1536.

The UPF 1548 may act as an anchor point for intra-RAT and inter-RAT mobility, an external PDU session point of interconnect to data network 1536, and a branching point to support multi-homed PDU session. The UPF 1548 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1548 may include an uplink classifier to support routing traffic flows to a data network.

The NSSF 1550 may select a set of network slice instances serving the UE 1502. The NSSF 1550 may also determine allowed NSSAI and the mapping to the subscribed S-NSSAIs, if needed. The NSSF 1550 may also determine the AMF set to be used to serve the UE 1502, or a list of candidate AMFs based on a suitable configuration and possibly by querying the NRF 1554. The selection of a set of network slice instances for the UE 1502 may be triggered by the AMF 1544 with which the UE 1502 is registered by interacting with the NSSF 1550, which may lead to a change of AMF. The NSSF 1550 may interact with the AMF 1544 via an N22 reference point; and may communicate with another NSSF in a visited network via an N31 reference point (not shown). Additionally, the NSSF 1550 may exhibit an Nnssf service-based interface.

The NEF 1552 may securely expose services and capabilities provided by 3GPP network functions for third party, internal exposure/re-exposure. AFs (e.g., AF 1560), edge computing or fog computing systems, etc. In such embodiments, the NEF 1552 may authenticate, authorize, or throttle the AFs. NEF 1552 may also translate information exchanged with the AF 1560 and information exchanged with internal network functions. For example, the NEF 1552 may translate between an AF-Service-Identifier and an internal 5GC information. NEF 1552 may also receive information from other NFs based on exposed capabilities of other NFs. This information may be stored at the NEF 1552 as structured data, or at a data storage NF using standardized interfaces. The stored information can then be re-exposed by the NEF 1552 to other NFs and AFs, or used for other purposes such as analytics. Additionally, the NEF 1552 may exhibit an Nnef service-based interface.

The NRF 1554 may support service discovery functions, receive NF discovery requests from NF instances, and provide the information of the discovered NF instances to the NF instances. NRF 1554 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1554 may exhibit the Nnrf service-based interface.

The PCF 1556 may provide policy rules to control plane functions to enforce them, and may also support unified policy framework to govern network behavior. The PCF 1556 may also implement a front end to access subscription information relevant for policy decisions in a UDR of the UDM 1558. In addition to communicating with functions over reference points as shown, the PCF 1556 exhibit an Npcf service-based interface.

The UDM 1558 may handle subscription-related information to support the network entities' handling of communication sessions, and may store subscription data of UE 1502. For example, subscription data may be communicated via an N8 reference point between the UDM 1558 and the AMF 1544. The UDM 1558 may include two parts, an application front end and a UDR. The UDR may store subscription data and policy data for the UDM 1558 and the PCF 1556, and/or structured data for exposure and application data (including PFDs for application detection, application request information for multiple UEs 1502) for the NEF 1552. The Nudr service-based interface may be exhibited by the UDR 221 to allow the UDM 1558, PCF 1556, and NEF 1552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1558 may exhibit the Nudm service-based interface.

The AF 1560 may provide application influence on traffic routing, provide access to NEF, and interact with the policy framework for policy control.

In some embodiments, the 5GC 1540) may enable edge computing by selecting operator/3$^{rd}$ party services to be geographically close to a point that the UE 1502 is attached to the network. This may reduce latency and load on the network. To provide edge-computing implementations, the 5GC 1540) may select a UPF 1548 close to the UE 1502 and execute traffic steering from the UPF 1548 to data network 1536 via the N6 interface. This may be based on the UE subscription data, UE location, and information provided by the AF 1560. In this way, the AF 1560 may influence UPF (re)selection and traffic routing. Based on operator deployment, when AF 1560 is considered to be a trusted entity, the network operator may permit AF 1560 to interact directly with relevant NFs. Additionally, the AF 1560 may exhibit an Naf service-based interface.

The data network 1536 may represent various network operator services, Internet access, or third party services that may be provided by one or more servers including, for example, application/content server 1538.

FIG. 16 schematically illustrates a wireless network 1600 in accordance with various embodiments. The wireless network 1600 may include a UE 1602 in wireless communication with an AN 1604. The UE 1602 and AN 1604 may be similar to, and substantially interchangeable with, like-named components described elsewhere herein.

The UE 1602 may be communicatively coupled with the AN 1604 via connection 1606. The connection 1606 is illustrated as an air interface to enable communicative coupling, and can be consistent with cellular communications protocols such as an LTE protocol or a 5G NR protocol operating at mmWave or sub-6 GHz frequencies.

The UE 1602 may include a host platform 1608 coupled with a modem platform 1610. The host platform 1608 may include application processing circuitry 1612, which may be coupled with protocol processing circuitry 1614 of the modem platform 1610. The application processing circuitry 1612 may run various applications for the UE 1602 that source/sink application data. The application processing circuitry 1612 may further implement one or more layer operations to transmit/receive application data to/from a data network. These layer operations may include transport (for example UDP) and Internet (for example, IP) operations The protocol processing circuitry 1614 may implement one or more of layer operations to facilitate transmission or reception of data over the connection 1606. The layer operations implemented by the protocol processing circuitry 1614 may include, for example, MAC, RLC, PDCP, RRC and NAS operations.

The modem platform 1610 may further include digital baseband circuitry 1616 that may implement one or more layer operations that are "below" layer operations performed by the protocol processing circuitry 1614 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1610 may further include transmit circuitry 1618, receive circuitry 1620, RF circuitry 1622, and RF front end (RFFE) 1624, which may include or connect to one or more antenna panels 1626. Briefly, the transmit circuitry 1618 may include a digital-to-analog converter, mixer, intermediate frequency (IF) components, etc.; the receive circuitry 1620 may include an analog-to-digital converter, mixer, IF components, etc.; the RF circuitry 1622 may include a low-noise amplifier, a power amplifier, power tracking components, etc.; RFFE 1624 may include filters (for example, surface/bulk acoustic wave filters), switches, antenna tuners, beamforming components (for example, phase-array antenna components), etc. The selection and arrangement of the components of the transmit circuitry 1618, receive circuitry 1620, RF circuitry 1622, RFFE 1624, and antenna panels 1626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1614 may include one or more instances of control circuitry (not shown) to provide control functions for the transmit/receive components.

A UE reception may be established by and via the antenna panels 1626, RFFE 1624, RF circuitry 1622, receive circuitry 1620, digital baseband circuitry 1616, and protocol processing circuitry 1614. In some embodiments, the antenna panels 1626 may receive a transmission from the AN 1604 by receive-beamforming signals received by a plurality of antennas/antenna elements of the one or more antenna panels 1626.

A UE transmission may be established by and via the protocol processing circuitry 1614, digital baseband circuitry 1616, transmit circuitry 1618, RF circuitry 1622, RFFE 1624, and antenna panels 1626. In some embodiments, the transmit components of the UE 1604 may apply a spatial filter to the data to be transmitted to form a transmit beam emitted by the antenna elements of the antenna panels 1626.

Similar to the UE 1602, the AN 1604 may include a host platform 1628 coupled with a modem platform 1630. The host platform 1628 may include application processing circuitry 1632 coupled with protocol processing circuitry 1634 of the modem platform 1630. The modem platform may further include digital baseband circuitry 1636, transmit circuitry 1638, receive circuitry 1640, RF circuitry 1642, RFFE circuitry 1644, and antenna panels 1646. The components of the AN 1604 may be similar to and substantially interchangeable with like-named components of the UE 1602. In addition to performing data transmission/reception as described above, the components of the AN 1608 may perform various logical functions that include, for example, RNC functions such as radio bearer management, uplink and downlink dynamic radio resource management, and data packet scheduling.

FIG. 17 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1700 including one or more processors (or processor cores) 1710, one or more memory/storage devices 1720, and one or more communication resources 1730, each of which may be communicatively coupled via a bus 1740 or other interface circuitry. For embodiments where node virtualization (e.g., NFV) is utilized, a hypervisor 1702 may be executed to provide an execution environment for one or more network slices/sub-slices to utilize the hardware resources 1700).

The processors 1710 may include, for example, a processor 1712 and a processor 1714. The processors 1710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1720 may include main memory, disk storage, or any suitable combination thereof. The memory/storage devices 1720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1730 may include interconnection or network interface controllers, components, or other suitable devices to communicate with one or more peripheral devices 1704 or one or more databases 1706 or other network elements via a network 1708. For example, the communication resources 1730 may include wired communication components (e.g., for coupling via USB, Ethernet, etc.), cellular communication components, NFC components, Bluetooth®(or Bluetooth® Low Energy) components, Wi-Fi® components, and other communication components.

Instructions 1750 may comprise software, a program, an application, an applet, an app, or other executable code for causing at least any of the processors 1710 to perform any one or more of the methodologies discussed herein. The instructions 1750 may reside, completely or partially, within at least one of the processors 1710 (e.g., within the processor's cache memory), the memory/storage devices 1720, or any suitable combination thereof. Furthermore, any portion of the instructions 1750 may be transferred to the hardware resources 1700 from any combination of the peripheral devices 1704 or the databases 1706. Accordingly, the memory of processors 1710, the memory/storage devices 1720, the peripheral devices 1704, and the databases 1706 are examples of computer-readable and machine-readable media.

Example Procedures

In some embodiments, the electronic device(s), network(s), system(s), chip(s) or component(s), or portions or implementations thereof, of FIGS. 15-17, or some other figure herein, may be configured to perform one or more processes, techniques, or methods as described herein, or portions thereof. One such process 1800 is depicted in FIG. 18, which may be performed by a UE or a portion thereof. For example, the process 1800 may include, at 1802, receiving repetitions of a downlink control information (DCI) from multiple transmission-reception points (TRPs), wherein the DCI is to trigger a channel state information (CSI)-reference signal (RS) on a CSI-RS resource associated with a sounding reference signal (SRS) resource set. The SRS resource set may be configured with a usage of non-codebook. In some embodiments, the SRS resource set may be the only SRS resource set configured for non-codebook.

At 1804, the process 1800 may further include identifying that a scheduling offset between the DCI and the CSI-RS resource is less than a threshold. At 1806, the process 1800 may further include determining, based on the identification, a default beam for transmission of the CSI-RS. In some embodiments, the repetitions of the DCI are received in different control resource sets (CORESETs), and wherein the default beam corresponds to a transmission control index (TCI) state of a first CORESET of the CORESETs (e.g., the CORESET with the lowest ID among the CORESETs).

FIG. 19 illustrates another process 1900 in accordance with various embodiments. The process may be performed by a TRP, a gNB (e.g., a gNB that implements one or more TRPs) or a portion thereof. At 1902, the process 1900 may include encoding, for transmission to a user equipment (UE), one or more repetitions of a downlink control information (DCI) that is transmitted from multiple transmission-reception points (TRPs), wherein the DCI is to trigger a channel state information (CSI)-reference signal (RS) on a CSI-RS resource associated with a sounding reference signal (SRS) resource set. The SRS resource set may be configured with a usage of non-codebook. In some embodiments, the SRS resource set may be the only SRS resource set configured for non-codebook.

At 1904, the process 1900 may further include identifying that a scheduling offset between the DCI and the CSI-RS resource is less than a threshold. At 1906, the process 1900 may further include determining, based on the identification, a default beam for transmission of the CSI-RS. At 1908, the process 1900 may further include receiving the CSI-RS from the UE based on the default beam. In some embodiments, the repetitions of the DCI are transmitted in different control resource sets (CORESETs), and wherein the default beam corresponds to a transmission control index (TCI) state of a first CORESET of the CORESETs (e.g., the CORESET with the lowest ID among the CORESETs).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include a method of operating a wireless network that includes a transmission reception point (TRP) adapted to work in single TRP or multi-TRP mode.

Example A2 may include the method of example A1 or some other example herein, wherein the TRP can configure the UE with non-codebook based uplink transmission. And up to two SRS resource sets could be configured for non-codebook based PUSCH in multi-TRP.

Example A3 may include the method of example A2 or some other example herein, wherein for non-codebook based uplink transmission in multi-TRP, the multiple CSI-RS resources associated with different SRS resource set could be transmitted over different slots, so that the UE has sufficient time to switch beams and/or switch antenna panel.

Example A4 may include the method of example A3 or some other example herein, wherein for non-codebook based uplink transmission, the associated CSI-RS resource could be sent over a different slot with a configurable slot offset with reference to the DCI slot.

Example A5 may include the method of example A4 or some other example herein, wherein the slot offset of CSI-RS could be configured by RRC. The slot offset could be configured to SRS resource set or NZP CSI-RS resource.

Example A6 may include the method of example A5 or some other example herein, wherein regarding the slot offset of CSI-RS configured by RRC, it could be interpreted to indicate an available slot after the slot carrying DCI triggering the SRS for non-codebook based UL transmission. One slot is defined as 'available slot' for CSI-RS if the slot is:

A downlink (DL) slot

A flexible slot and the OFDM symbol positions configured for CSI-RS are downlink (DL) symbol(s) or flexible symbol(s)

Example A7 may include the method of example A4 or some other example herein. wherein the slot offset of CSI-RS transmission for non-codebook based UL in multi-TRP could be dynamically updated by MAC-CE or dynamically indicated by DCI. A new MAC-CE could be introduced to update the slot offset for CSI-RS. If the CSI-RS slot offset is dynamically indicated by DCI, a new field should be introduced to DCI format that could trigger SRS (DCI format 0_1/0_2/1_1/1_2/2_3). The new field could indicate the slot offset for one CSI-RS resource or for two CSI-RS resources.

Example A8 may include the method of example A3 or some other example herein, wherein if two SRS resource sets for non-codebook based transmission are triggered, for the time gap Δ1 which is between DCI and the 1st CSI-RS, if DCI and the 1st CSI-RS is from the same TRP, then there is no requirement on Δ1. The 1st CSI-RS could be sent over the same slot as the DCI slot. In another example, the time gap Δ1 should be larger than the DCI decoding time T3. If DCI and the 1st CSI-RS is sent by different TRP, then the time gap Δ1 should be larger than the UE beam switching time (T1) and/or UE antenna panel switching time (T2). In another example, the time gap Δ1 should be larger than the UE beam switching time (T1) and/or UE antenna panel switching time (T2), plus the DCI decoding time T3. In another example, no matter whether the DCI and the 1st CSI-RS are sent from the same TRP or not, the time gap Δ1 should be larger than a common threshold, wherein the threshold could be up to UE capability. For the time gap Δ2 which is between the two CSI-RS resources, it should be larger than the UE beam switching time (T1) and/or UE antenna panel switching time (T2).

Example A9 may include the method of example A3 or some other example herein, wherein in order to reduce the UE beam switching/panel switching, if multiple SRS resource sets are triggered for non-codebook based PUSCH in multi-TRP, the UE should be configured to send the 1st SRS resource set associated with the 1st CSI-RS after the 1st CSI-RS is sent by the network side. And the transmission of the 1st SRS resource set should be prior to the 2nd CSI-RS.

Example A10 may include the method of example A3 or some other example herein, wherein if single SRS resource set for non-codebook based transmission is triggered, for the time gap Δ1 which is between DCI and CSI-RS, if DCI and the CSI-RS is from the same TRP, then there is no requirement on Δ1. The CSI-RS could be sent over the same slot as the DCI slot. In another example, the time gap Δ1 should be larger than the DCI decoding time T3. If DCI and the CSI-RS is sent by different TRP, then the time gap Δ1 should be larger than the UE beam switching time (T1) and/or UE antenna panel switching time (T2). In another example, the time gap Δ1 should be larger than the UE beam switching time (T1) and/or UE antenna panel switching time (T2), plus the DCI decoding time T3. In another example, no matter whether the DCI and the CSI-RS are sent from the same TRP or not, the time gap Δ1 should be larger than a common threshold, wherein the threshold could be up to UE capability.

Example A11 may include the method of example A3 or some other example herein, wherein it could be restricted that for non-codebook based PUSCH in multi-TRP, only one SRS resource set is triggered by one DCI. In addition, the DCI and the associated CSI-RS should be sent by the same TRP. In this case, the associated CSI-RS resource could be sent over the same slot as the DCI.

Example A12 may include the method of example A2 or some other example herein, wherein for FR1, since there is no UE beam switching/panel switching, the multiple CSI-RS resources associated with non-codebook based PUSCH could be transmitted over the same slot as the DCI triggering SRS. E.g. slot offset for CSI-RS is not configured or the configurable slot offset for CSI-RS is set to zero.

Example A13 may include the method of example A2 or some other example herein, wherein for FR1, if multiple SRS resource sets are triggered for non-codebook based PUSCH in multi-TRP, the associated multiple CSI-RS resources can also be distributed over different slot.

Example A14 includes a method comprising:
  determining configuration information associated with multiple channel state information-reference signal (CSI-RS) resources associated with one or more sounding reference signal (SRS) resource sets; and
  encoding a message that includes the configuration information for transmission to a user equipment (UE), wherein the message is encoded for transmission over multiple slots.

Example A15 includes the method of example A14 or some other example herein, wherein the message is encoded for transmission based on a slot offset with reference to a downlink control information (DCI) slot.

Example A16 includes the method of example A15 or some other example herein, wherein the slot offset is configured to an SRS resource set or non-zero-power (NZP) CSI-RS resource.

Example A17 includes the method of example A14 or some other example herein, further comprising encoding a downlink control information (DCI) message that includes an indication of a joint downlink/uplink transmission configuration indicator (DL/UL TCI) state.

Example A18 includes a method comprising:
  receiving configuration information associated with multiple channel state information-reference signal (CSI-RS) resources associated with one or more sounding reference signal (SRS) resource sets; and
  encoding an uplink message for transmission to a next-generation NodeB (gNB) based on the received configuration information.

Example A19 includes the method of example A18 or some other example herein, wherein the uplink message is a physical uplink shared channel (PUSCH) message.

Example A20 includes the method of example A18 or some other example herein, further comprising receiving a downlink control information (DCI) message that includes an indication of a joint downlink/uplink transmission configuration indicator (DL/UL TCI) state.

Example A21 includes the method of example A20 or some other example herein, wherein the indicated joint DL/UL TCI state is applied to a transmission of associated CSI-RS in downlink, but not applied for SRS transmission in uplink.

Example A22 includes the method of example A20 or some other example herein, wherein the indicated joint DL/UL TCI state is used for both a CSI-RS transmission and an SRS transmission.

Example A23 includes the method of example A20 or some other example herein, wherein the indicated joint DL/UL TCI state is used for a non-codebook SRS transmission.

Example A24 includes a method of a user equipment (UE), the method comprising:
  receiving configuration information for a sounding reference signal (SRS) resource set with a usage of non-codebook;
  receiving, in a first slot K, a downlink control information (DCI) to trigger an aperiodic SRS based on the SRS resource set;
  determining a second slot K+L for a CSI-RS associated with the aperiodic SRS, wherein L is a predefined slot offset.

Example A25 includes the method of example A24 or some other example herein, wherein the slot offset corresponds to a slot or an available slot.

Example A26 may include the method of example A25 or some other example herein, wherein a slot is an available slot if it is a downlink slot.

Example A27 may include the method of example A25 or some other example herein, wherein a slot is an available slot if it is a downlink slot or a flexible slot and OFDM symbol positions configured for the CSI-RS are DL symbols or flexible symbols.

Example A28 may include the method of example A24-A27 or some other example herein, wherein the configuration information is for two or more SRS resource sets with the usage of non-codebook, and wherein different predefined slot offsets are used for CSI-RSs associated with the respective two or more SRS resource sets.

Example B1 may include one or more non-transitory computer-readable media (NTCRM) having instructions, stored thereon, that when executed by one of more processors of a user equipment (UE) cause the UE to: receive repetitions of a downlink control information (DCI) from multiple transmission-reception points (TRPs), wherein the DCI is to trigger a channel state information (CSI)-reference signal (RS) on a CSI-RS resource associated with a sounding reference signal (SRS) resource set; identify that a scheduling offset between the DCI and the CSI-RS resource is less than a threshold; and determine, based on the identification, a default beam for transmission of the CSI-RS.

Example B2 may include the one or more NTCRM of example B1, wherein the repetitions of the DCI are received in different control resource sets (CORESETs), and wherein the default beam corresponds to a transmission control index (TCI) state of a first CORESET of the CORESETs.

Example B3 may include the one or more NTCRM of example B2, wherein the first CORESET has a lowest ID among the CORESETs.

Example B4 may include the one or more NTCRM of example B1, wherein the SRS resource set is configured as non-codebook.

Example B5 may include the one or more NTCRM of example B4, wherein the SRS resource set is the only SRS resource set configured for non-codebook.

Example B6 may include the one or more NTCRM of any one of examples B1-B5, wherein the threshold is based on a capability of the UE.

Example B7 may include one or more non-transitory computer-readable media (NTCRM) having instructions, stored thereon, that when executed by one of more processors of a next generation Node B (gNB) cause the gNB to: encode, for transmission to a user equipment (UE), one or more repetitions of a downlink control information (DCI) that is transmitted from multiple transmission-reception points (TRPs), wherein the DCI is to trigger a channel state information (CSI)-reference signal (RS) on a CSI-RS resource associated with a sounding reference signal (SRS) resource set; identify that a scheduling offset between the DCI and the CSI-RS resource is less than a threshold; determine, based on the identification, a default beam for transmission of the CSI-RS; and receive the CSI-RS from the UE based on the default beam.

Example B8 may include the one or more NTCRM of example B7, wherein the repetitions of the DCI are transmitted in different control resource sets (CORESETs), and wherein the default beam corresponds to a transmission control index (TCI) state of a first CORESET of the CORE-SETs.

Example B9 may include the one or more NTCRM of example B8, wherein the first CORESET has a lowest ID among the CORESETs.

Example B10 may include the one or more NTCRM of example B6, wherein the instructions, when executed, are further to cause the gNB to configure the SRS resource set for the UE with a usage of non-codebook.

Example B11 may include the one or more NTCRM of example B10, wherein the SRS resource set is the only SRS resource set configured for non-codebook.

Example B12 may include the one or more NTCRM of any one of examples B7-B11, wherein the threshold is based on a capability of the UE.

Example B13 may include an apparatus to be implemented in a user equipment (UE), the apparatus comprising: a memory to store configuration information for a sounding reference signal (SRS) resource set with a usage of non-codebook; and processor circuitry coupled to the memory. The processor circuitry is to: decode, in a first slot K, a downlink control information (DCI) to trigger an aperiodic CSI-RS based on the SRS resource set; and determine a second slot K+L for transmission of the CSI-RS, wherein L is a predefined slot offset.

Example B14 may include the apparatus of example B13, wherein the slot offset corresponds to a slot or an available slot.

Example B15 may include the apparatus of example B14, wherein a slot is an available slot if it is a downlink slot.

Example B16 may include the apparatus of example B14, wherein a slot is an available slot if it is a downlink slot or a flexible slot and symbol positions configured for the CSI-RS are downlink symbols or flexible symbols.

Example B17 may include the apparatus of any one of examples B13-B16, wherein the SRS resource set is a first SRS resource set, wherein the memory is to store configuration information for a multiple SRS resource sets, including the first SRS resource set, with the usage non-codebook, and wherein the processor circuitry is to use different predefined slot offsets for CSI-RSs associated with the respective SRS resource sets.

Example Z01 may include an apparatus comprising means to perform one or more elements of a method described in or related to any of examples A1-A28, B1-B17, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A28, B1-B17, or any other method or process described herein.

Example Z03 may include an apparatus comprising logic, modules, or circuitry to perform one or more elements of a method described in or related to any of examples A1-A28, B1-B17, or any other method or process described herein.

Example Z04 may include a method, technique, or process as described in or related to any of examples A1-A28, B1-B17, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A28, B1-B17, or portions thereof.

Example Z06 may include a signal as described in or related to any of examples A1-A28, B1-B17, or portions or parts thereof.

Example Z07 may include a datagram, packet, frame, segment, protocol data unit (PDU), or message as described in or related to any of examples A1-A28, B1-B17, or portions or parts thereof, or otherwise described in the present disclosure.

Example Z08 may include a signal encoded with data as described in or related to any of examples A1-A28, or portions or parts thereof, or otherwise described in the present disclosure.

Example Z09 may include a signal encoded with a datagram, packet, frame, segment, protocol data unit (PDU), or message as described in or related to any of examples A1-A28, B1-B17, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A28, B1-B17, or portions thereof.

Example Z11 may include a computer program comprising instructions, wherein execution of the program by a processing element is to cause the processing element to carry out the method, techniques, or process as described in or related to any of examples A1-A28, B1-B17, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |

-continued

| | |
|---|---|
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |

-continued | -continued

| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |

| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |

| | |
|---|---|
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |

-continued

| | |
|---|---|
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |

-continued

| | |
|---|---|
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |

-continued

| | |
|---|---|
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

TERMINOLOGY

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/ or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one of more processors of a user equipment (UE) cause the UE to:

receive repetitions of a downlink control information (DCI) from multiple transmission-reception points (TRPs), wherein the DCI is to trigger a channel state information (CSI)-reference signal (RS) on a CSI-RS resource associated with a sounding reference signal (SRS) resource set;

identify that a scheduling offset between the DCI and the CSI-RS resource is less than a threshold; and determine, based on the identifying, a default beam for transmission of the CSI-RS, wherein the default beam corresponds to a transmission configuration indicator (TCI) state associated with the repetitions of the DCI, wherein the SRS resource set is a first SRS resource set, wherein the NTCRM is to store configuration information for multiple SRS resource sets, including the first SRS resource set, with a usage of non-codebook, and wherein the instructions cause the UE to use different predefined slot offsets for CSI-RSs associated with the respective SRS resource sets.

2. The one or more NTCRM of claim 1, wherein the repetitions of the DCI are received in different control resource sets (CORESETs), and wherein the default beam corresponds to a transmission control index (TCI) state of a first CORESET of the CORESETs.

3. The one or more NTCRM of claim 2, wherein the first CORESET has a lowest ID among the CORESETs.

4. The one or more NTCRM of claim 1, wherein the SRS resource set is configured as non-codebook.

5. The one or more NTCRM of claim 4, wherein the SRS resource set is the only SRS resource set configured for non-codebook.

6. The one or more NTCRM of any one of claim 1, wherein the threshold is based on a capability of the UE.

7. One or more non-transitory computer-readable media (NTCRM) having instructions, stored thereon, that when executed by one of more processors of a next generation Node B (gNB) cause the gNB to:

encode, for transmission to a user equipment (UE), one or more repetitions of a downlink control information (DCI) that is transmitted from multiple transmission-reception points (TRPs), wherein the DCI is to trigger a channel state information (CSI)-reference signal (RS) on a CSI-RS resource associated with a sounding reference signal (SRS) resource set;

identify that a scheduling offset between the DCI and the CSI-RS resource is less than a threshold;

determine, based on the identifying, a default beam for transmission of the CSI-RS, wherein the default beam corresponds to a transmission configuration indicator (TCI) state associated with the repetitions of the DCI, wherein the SRS resource set is a first SRS resource set, wherein the gNB is to configure the UE with multiple SRS resource sets, including the first SRS resource set, with a usage of non-codebook, and wherein the gNB is to use different predefined slot offsets for CSI-RSs associated with the respective SRS resource sets; and receive the CSI-RS from the UE based on the default beam.

8. The one or more NTCRM of claim 7, wherein the repetitions of the DCI are transmitted in different control resource sets (CORESETs), and wherein the default beam corresponds to a transmission control index (TCI) state of a first CORESET of the CORESETs.

9. The one or more NTCRM of claim 8, wherein the first CORESET has a lowest ID among the CORESETs.

10. The one or more NTCRM of claim 7, wherein the instructions, when executed, are further to cause the gNB to configure the SRS resource set for the UE with a usage of non-codebook.

11. The one or more NTCRM of claim 10, wherein the SRS resource set is the only SRS resource set configured for non-codebook.

12. The one or more NTCRM of any one of claim 7, wherein the threshold is based on a capability of the UE.

13. An apparatus to be implemented in a user equipment (UE), the apparatus comprising:

a memory to store configuration information for a sounding reference signal (SRS) resource set with a usage of non-codebook;

processor circuitry, coupled to the memory, to:

decode, in a first slot K, a downlink control information (DCI) to trigger an aperiodic CSI-RS based on the SRS resource set; and determine a second slot K+L for transmission of the CSI-RS, wherein L is a predefined slot offset of available slots subsequent to the first slot K, wherein the SRS resource set is a first SRS resource set, wherein the memory is to store configuration information for multiple SRS resource sets, including the first SRS resource set, with the usage non-codebook, and wherein the processor circuitry is to use different predefined slot offsets for CSI-RSs associated with the respective SRS resource sets.

14. The apparatus of claim 13, wherein the slot offset corresponds to a slot or an available slot.

15. The apparatus of claim 14, wherein a slot is an available slot if it is a downlink slot.

16. The apparatus of claim 14, wherein a slot is an available slot if it is a downlink slot or a flexible slot and symbol positions configured for the CSI-RS are downlink symbols or flexible symbols.

* * * * *